(12) United States Patent
Zeller

(10) Patent No.: US 8,486,477 B2
(45) Date of Patent: Jul. 16, 2013

(54) GAS-EFFUSING COMPOSITIONS AND METHODS OF MAKING AND USING SAME

(75) Inventor: Bary Lyn Zeller, Glenview, IL (US)

(73) Assignee: Intercontinental Great Brands LLC, East Hanover, NJ (US)

( * ) Notice: Subject to any disclaimer, the term of this patent is extended or adjusted under 35 U.S.C. 154(b) by 716 days.

(21) Appl. No.: 12/257,539

(22) Filed: Oct. 24, 2008

(65) Prior Publication Data

US 2010/0104717 A1 Apr. 29, 2010

(51) Int. Cl.
*A23L 2/40* (2006.01)
(52) U.S. Cl.
USPC ............ 426/591; 426/564; 426/569; 426/580
(58) Field of Classification Search
USPC ................ 426/443, 471, 564, 569, 580, 583, 426/588, 590, 591
See application file for complete search history.

(56) References Cited

U.S. PATENT DOCUMENTS

| | | | |
|---|---|---|---|
| 3,012,893 | A | 12/1961 | Kremzner et al. |
| 3,985,909 | A | 10/1976 | Kirkpatrick |
| 3,985,910 | A | 10/1976 | Kirkpatrick |
| 4,001,457 | A | 1/1977 | Hegadorn |
| 4,262,029 | A | 4/1981 | Kleiner et al. |
| 4,289,794 | A | 9/1981 | Kleiner et al. |
| 4,334,934 | A | 6/1982 | Barnes et al. |
| 4,826,699 | A | 5/1989 | Soe |
| 5,882,717 | A | 3/1999 | Panesar et al. |
| 6,129,943 | A | 10/2000 | Zeller et al. |
| 6,713,113 | B2 | 3/2004 | Bisperink et al. |
| 6,953,592 | B2 | 10/2005 | Darbyshire et al. |
| 2002/0127322 | A1 | 9/2002 | Bisperink et al. |
| 2002/0192329 | A1 | 12/2002 | Corriveau et al. |
| 2004/0096562 | A1 | 5/2004 | Bisperink et al. |
| 2005/0287268 | A1 | 12/2005 | Bisperink et al. |
| 2006/0040023 | A1 | 2/2006 | Zeller et al. |
| 2006/0040033 | A1 | 2/2006 | Zeller |
| 2006/0040034 | A1 | 2/2006 | Zeller et al. |
| 2006/0040038 | A1 | 2/2006 | Zeller et al. |
| 2006/0110516 | A1 | 5/2006 | Holtus et al. |

FOREIGN PATENT DOCUMENTS

| | | |
|---|---|---|
| EP | 1074181 | 2/2001 |
| EP | 1228694 | 8/2002 |
| EP | 1325680 | 7/2003 |
| EP | 1557091 | 7/2005 |
| EP | 1627568 | 2/2006 |
| EP | 1538924 | 9/2007 |
| WO | 0108504 | 2/2001 |
| WO | 02074096 | 9/2002 |
| WO | 2004019699 | 3/2004 |
| WO | 2006023564 | 3/2006 |
| WO | 2006023565 | 3/2006 |

OTHER PUBLICATIONS

B.L. Zeller, F.Z. Saleeb, "Production of Microporous Sugars for Adsorption of Volatile Flavors," Journal of Food Science, vol. 61, No. 4, 1996, pp. 749-752, 756.
B.L. Zeller, F.Z. Saleeb, R.D. Ludescher, "Trends in Development of Porous Carbohydrate Food Ingredients for Use in Flavor Encapsulation," Trends in Food Science & Technology, vol. 9, No. 11-12 [101/102], (1999), pp. 389-394.
B.L. Zeller, "Manufacture and Characterization of Microporous Carbohydrate Powders Designed for Flavor Adsorption," Rutgers University Library, Food Science M.S. Candidate, Dec. 30, 2004 (33 pages).
Schoonman et al., "The microstructure of foamed maltodextrin/sodium caseinate powders: a comparative study by microscopy and physical techniques," Food Res Int 2001, (abstract only, 1 page).
Daemen, "The estimation of the mean particle density, the vacuole volume and the porosity of spray-dried porous powders," Netherlands Milk & Dairy Journal, 1982, (abstract only, 1 page).
Verhey, "Vacuole formation in spray powder particles. I. Air incorporation and bubble expansion," Netherlands Milk & Dairy Journal 1972 (abstract only, 1 page).
Turkot, "Continuous vacuum drying of whole milk foam," Food Engineering 1969 (abstract only, 1 page).

*Primary Examiner* — Leslie Wong
(74) *Attorney, Agent, or Firm* — Fitch, Even, Tabin & Flannery LLP

(57) ABSTRACT

Gas-effusing compositions, particularly, particulate compositions having pressurized gas held within open internal voids thereof, are provided as well as methods of making and using such compositions.

28 Claims, 11 Drawing Sheets

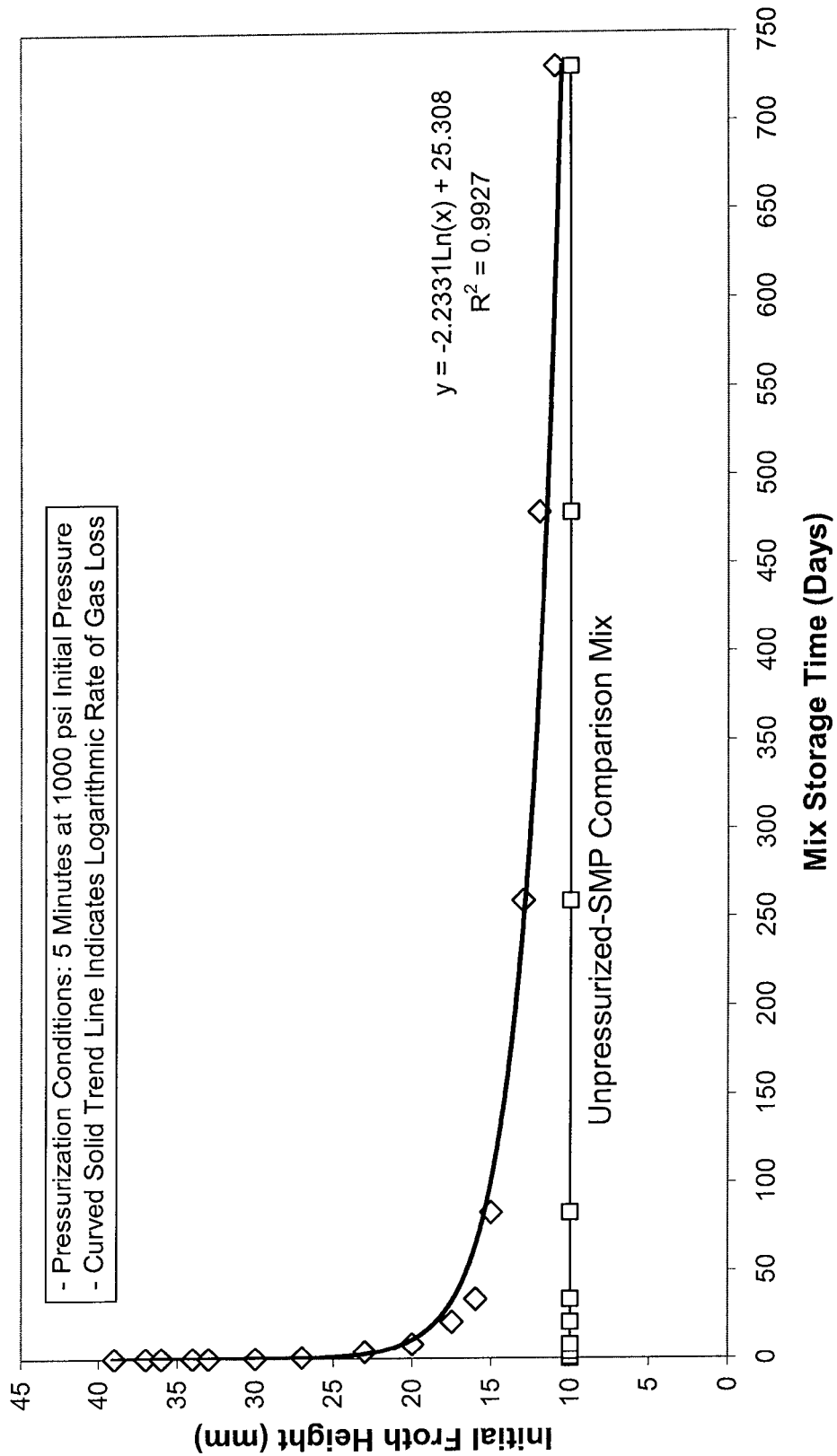
FIG. 1: Cappuccino Beverage Initial Froth Height vs Mix Storage Time

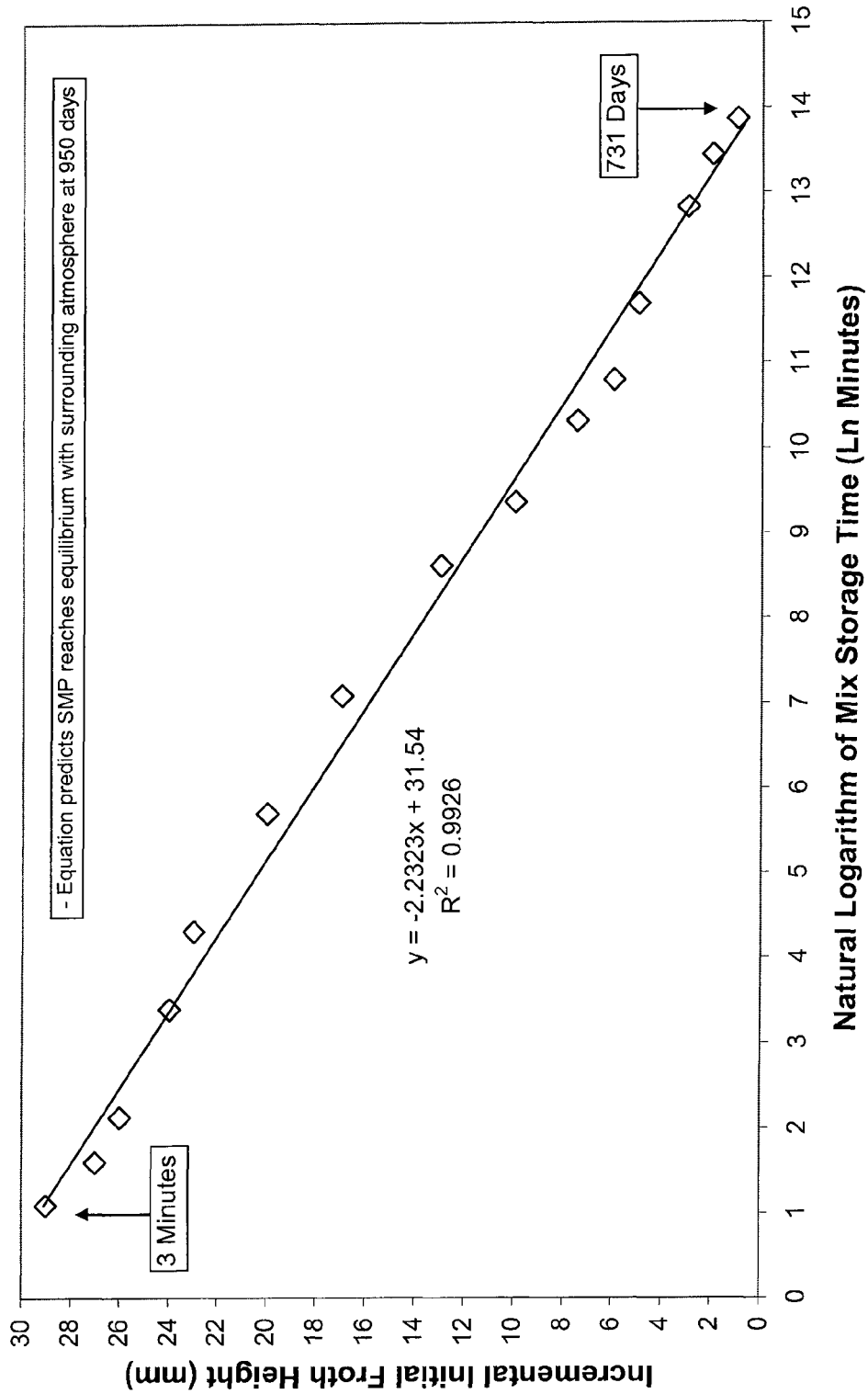

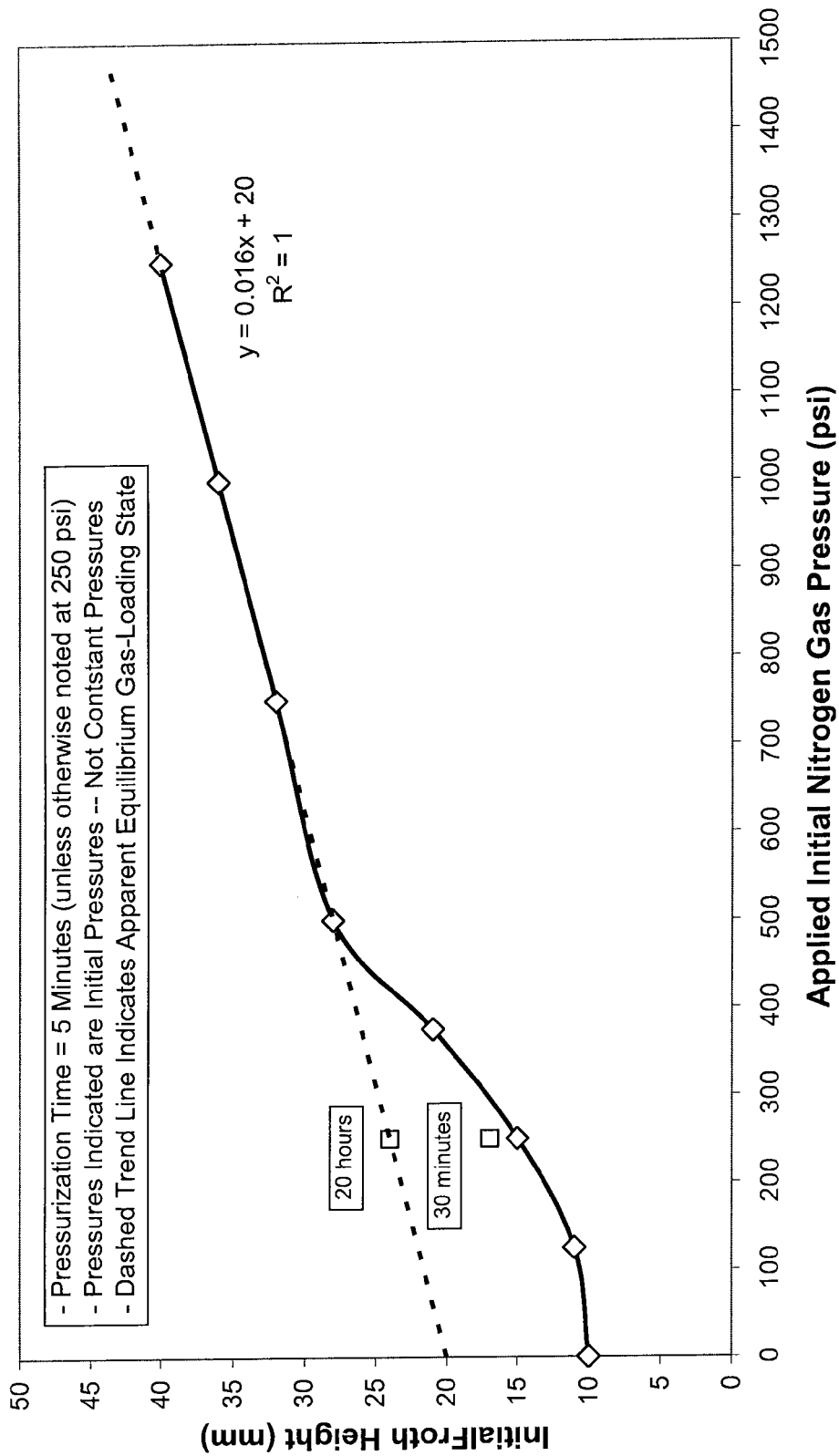
FIG. 3: Cappuccino Initial Froth Height vs SMP Pressurization

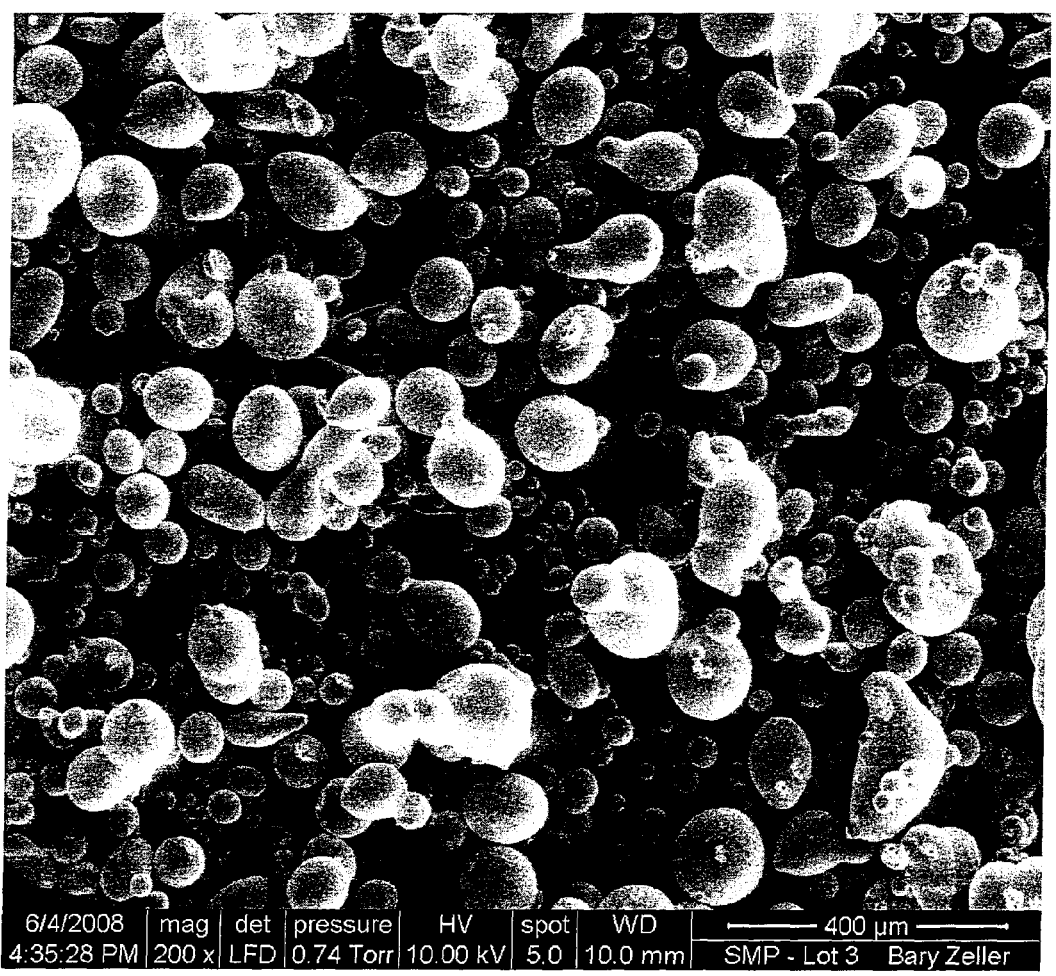
FIG. 4A: Particulate Ingredient at 200x Magnification

FIG. 4B: Particle Surface at 2607x Magnification

FIG. 4C: Particle Cross-Section at 1988x Magnification

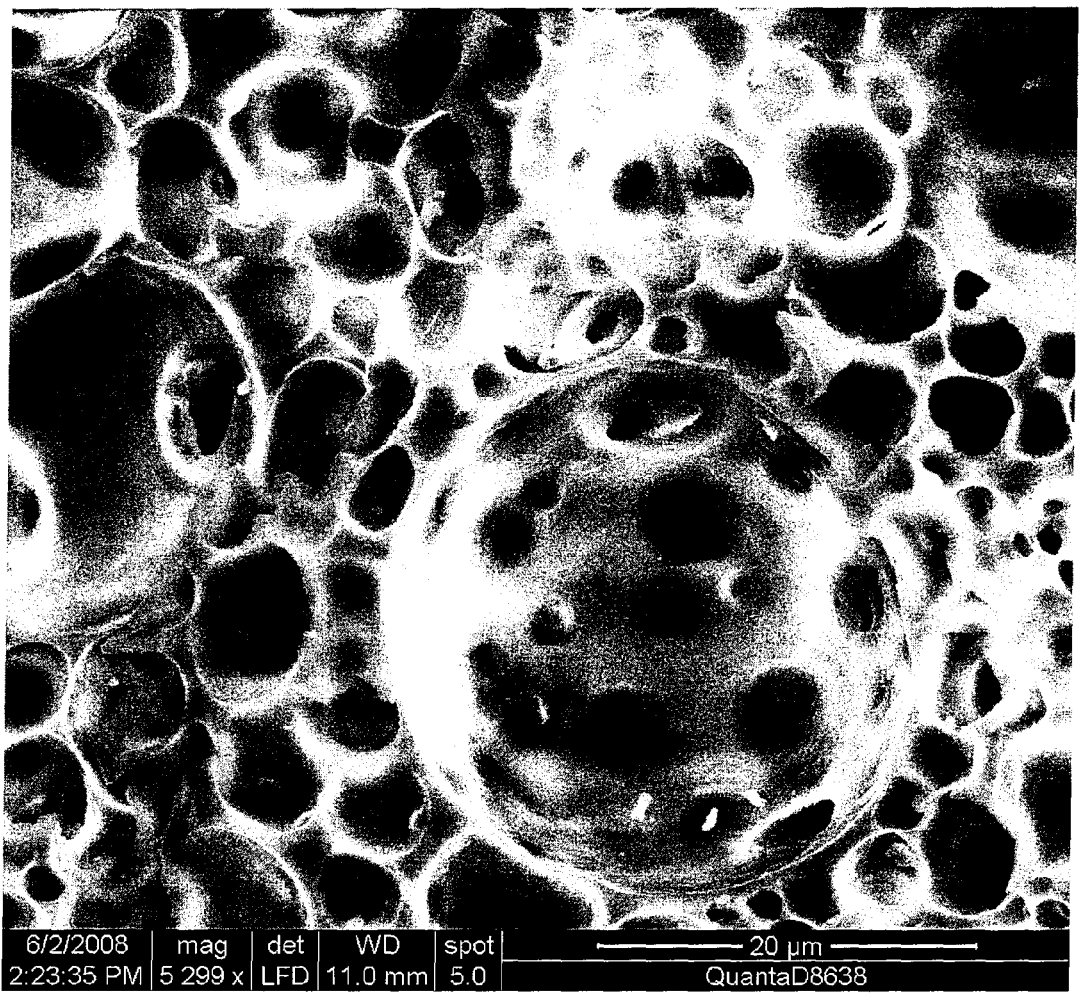
FIG. 4D: Particle Interior at 5299x Magnification

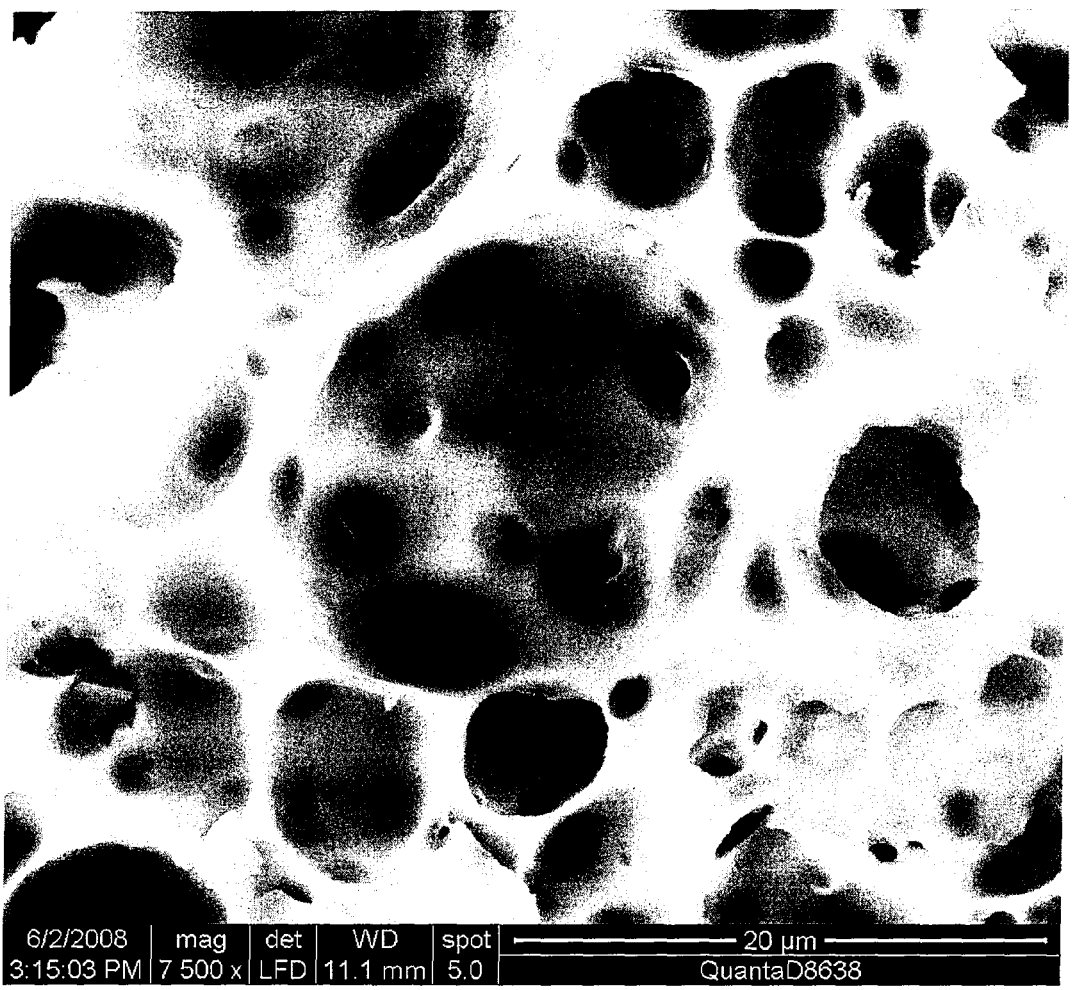
FIG. 4E: Particle Interior at 7500x Magnification

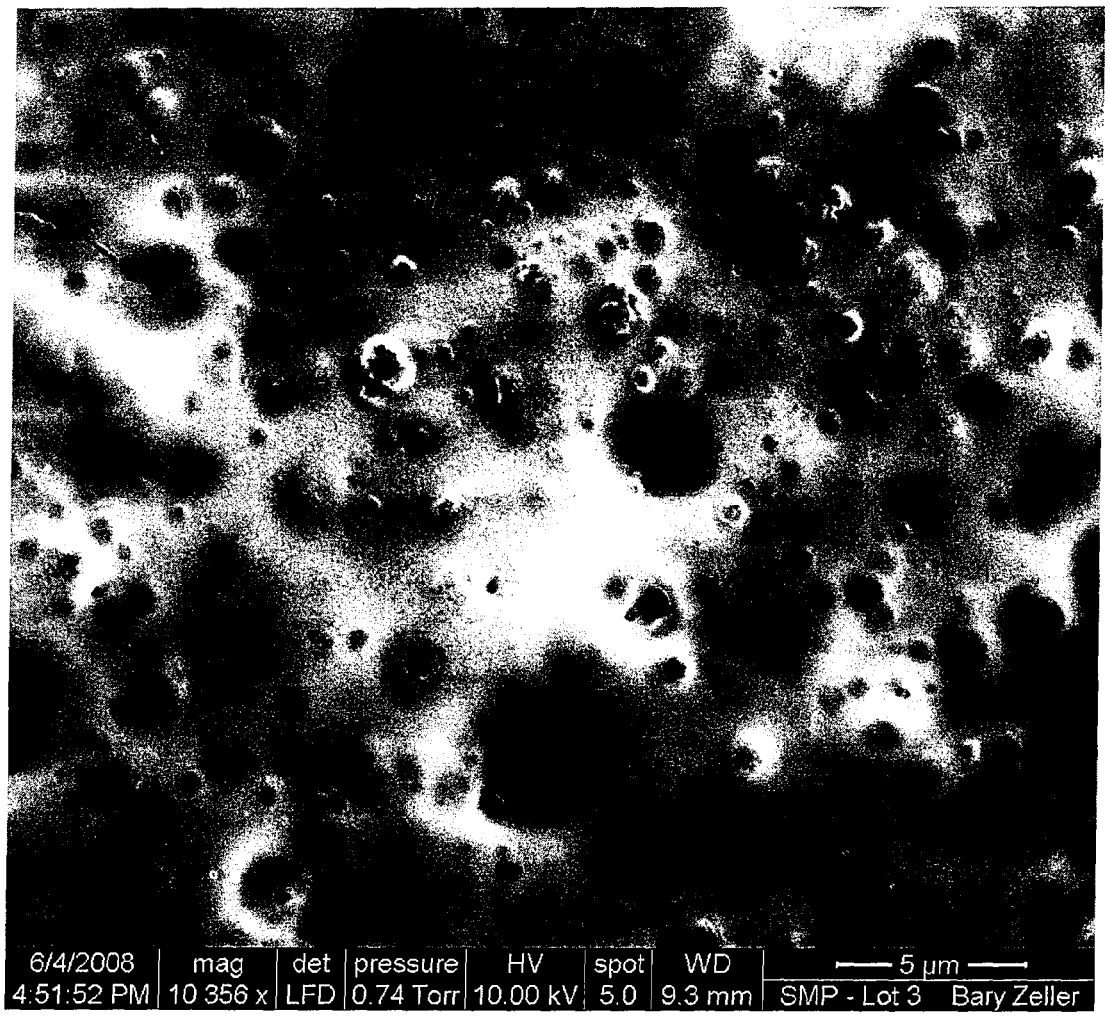
FIG. 4F: Particle Surface at 10356x Magnification

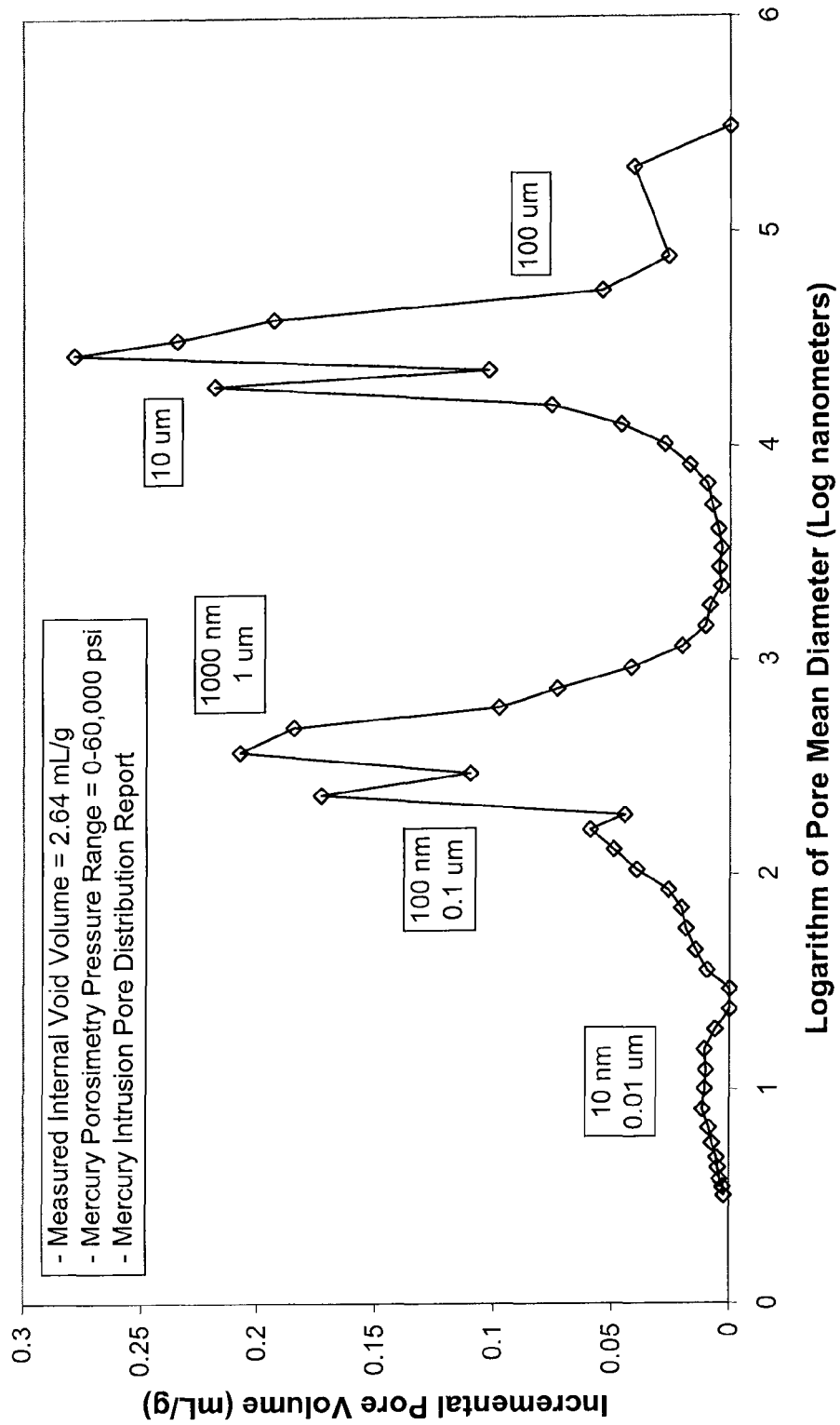
FIG. 5: Incremental Pore Volume vs Logarithm of Pore Mean Diameter
SMP Lot-3 Prior to Subjecting to Pressurized Gas to Create Gas-Effusing Composition

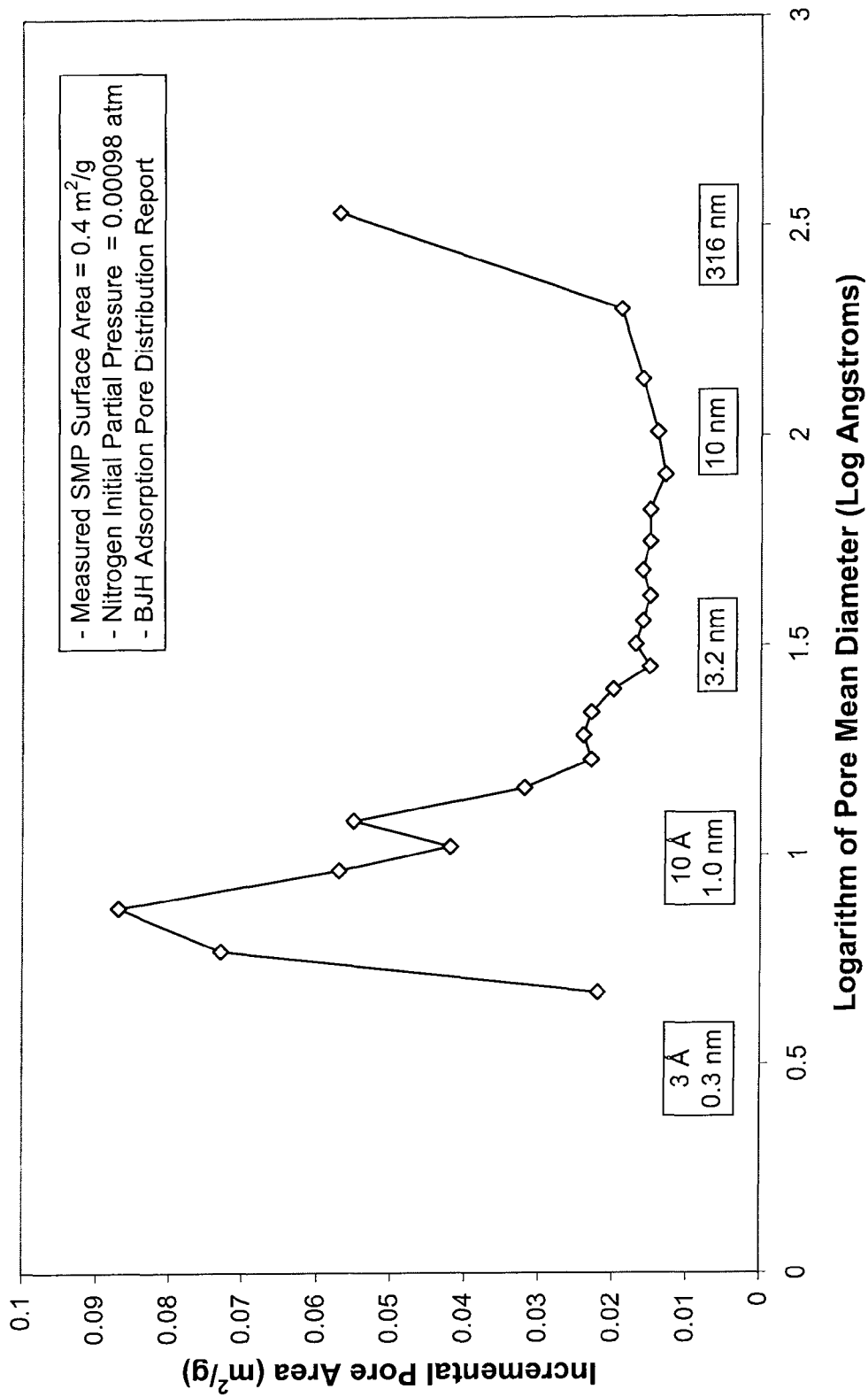

GAS-EFFUSING COMPOSITIONS AND METHODS OF MAKING AND USING SAME

FIELD OF THE INVENTION

The present invention relates to gas-effusing compositions and, in particular, to gas-effusing particulate compositions having pressurized gas held within internal voids within the particles that is able to escape slowly and controllably through restrictive passageways within the particles, and to methods of making and using such compositions. The gas-effusing compositions of the present invention may be used, for example, as soluble gas storage and delivery ingredients which provide foam, froth, or aerated texture when they are incorporated into instant food or beverage products and reconstituted with a liquid.

BACKGROUND OF THE INVENTION

A number of conventionally prepared food items include froth or foam. For example, cappuccino, milk shakes, and some soups may have froth or foam. While conventionally prepared food items may be considered preferable by some consumers, other consumers are increasingly demanding the convenience of consumer prepared instant food alternatives. In order to accommodate consumer preferences, manufacturers have developed instant food products which give consumers the food products they demand from a convenient instant food product by developing instant food items which have the same or similar characteristics as conventionally prepared food items. One challenge for manufacturers is how to produce a food product having froth or foam from an instant food item.

One prior solution used to manufacture an instant food product which has froth or foam is through the use of powdered foaming compositions which produce foam upon reconstitution in a liquid. Foaming powder compositions have been used to impart froth or foamed texture to a wide variety of foods and beverages. For example, foaming compositions have been used to impart froth or foamed texture to instant cappuccino and other coffee mixes, instant refreshing beverage mixes, instant soup mixes, instant milkshake mixes, instant dessert toppings, instant sauces, hot or cold cereals, and the like, when combined with water, milk, or other suitable liquid.

One prior method for manufacturing a foaming composition is provided by U.S. Pat. No. 6,713,113 which discloses a method for manufacturing a powdered soluble foaming ingredient comprised of a matrix containing carbohydrate, protein, and entrapped pressurized gas produced by heating the composition to above the glass transition temperature while contacting with pressurized gas in a pressure vessel, and then quenching by rapid release of gas pressure or cooling to reduce the temperature of the composition to below the glass transition temperature of the composition and prevent loss of pressurized gas from closed pores present in the matrix. Heating the composition above the glass transition temperature can potentially lead to undesirable nonoxidative browning (Maillard) reactions that can adversely affect the appearance, flavor and shelf-life of packaged food products. Also, heating a composition inside a pressure vessel to above its glass transition temperature typically requires use of highly-specialized equipment, prolonged processing times, and substantial energy, all of which can adversely increase equipment and manufacturing costs and substantially decrease production speeds.

International Pub. No. WO 2004/019699 discloses another process for manufacturing a foaming composition where a protein composition is subjected to gasification with pressurized gas in a pressure vessel at a temperature above the glass transition temperature of the composition, followed by quenching or cooling to reduce the temperature of the composition below the glass transition temperature and prevent loss of pressurized gas from closed pores present in the matrix. The foaming composition preferably contains a plasticizer such as a carbohydrate polyol or sugar alcohol and the foaming composition that forms the basis of all working examples disclosed therein contains carbohydrate glycerol at a level of 5% by weight.

U.S. Pat. App. Pub. No. 2003/0026836 discloses a method for forming tablets or powders of carbohydrate-based pharmaceuticals or foods which includes subjecting tablets or powders which comprise a beverage base such as soluble coffee, foamed powder, sugar and creamer to pressure and temperature above the glass transition temperature to produce a tablet or powder with increased solubility or dispersability on contact with water. In addition, a method is disclosed which promotes the dissolution or dispersion of a tablet or non-foaming powder by subjecting the tablet or powder to pressurized gas at temperature above the glass transition temperature while in a pressure vessel, followed by quenching or cooling effective to reduce the temperature to below the glass transition temperature so that pressurized gas is entrapped in closed pores present therein to promote dissolution or dispersion of the tablet or powder on contact with water.

U.S. Pat. App. Pub. No. 2006/0040033 and 2006/0040034 disclose methods for forming non-carbohydrate and non-protein foaming compositions, respectively, where protein or carbohydrate particles, respectively, are pressurized with gas in a pressure vessel, heated to a temperature above the glass transition temperature, cooled to a temperature below the glass transition temperature, and depressurized, effective to entrap pressurized gas in a plurality of sealed internal voids present in the particles. Although these methods provide carbohydrate-free or protein-free foaming compositions which are less susceptible to browning and formation of off-flavors during processing than other compositions which contain both protein and carbohydrate, they require the use of specialized equipment, application of heating and cooling, and long processing times.

U.S. Pat. App. Pub. No. 2006/0040023 discloses a method for manufacturing powdered soluble foaming compositions having increased foaming capacity, which comprise amorphous particles having atmospheric pressure gas held in open internal voids thereof. The method involves applying an external gas pressure to a powdered soluble spray-dried composition comprising amorphous particles having sealed vacuous internal voids and depressurizing the composition such that at least a portion of vacuous internal voids of the composition are opened to the atmosphere and filled with atmospheric pressure gas. Although the method has the advantage of being able to be conducted rapidly without heating or cooling, it does not entrap pressurized gas in the particles, which limits the foaming capacity of the composition relative to those manufactured according to methods that entrap pressurized gas in closed pores or sealed internal voids.

Although existing methods may be used to produce foaming food and beverage additives, there remains a need for a method for producing foaming compositions that can be used to hold and deliver large amounts of pressurized gas without the drawbacks of current methods. For example, existing methods subject the target compositions to high temperatures above the glass transition temperature which may result in browning of the composition, and off-flavors being produced. Additionally, existing methods provide compositions with pressurized gas entrapped in closed pores or sealed internal voids, and, although the volume of entrapped pressurized gas may decrease over time, such as from damage incurred by the composition during shipping and handling, contact with moisture in instant food or beverage mixes, or exposure to atmospheric water vapor, these compositions cannot be simply and rapidly manufactured on a large scale using conventional pressurization equipment without the need to conduct heating and cooling. Moreover, the existing compositions do not provide a conveniently refillable source of pressurized gas, especially after leaving the manufacturing facility.

The present invention may be used to fulfill these needs, as well as other needs and benefits, as will be apparent from the following description of embodiments of the present invention.

SUMMARY OF THE INVENTION

Thus, according to one aspect, the present invention provides a gas-effusing particulate composition comprising particles having an external surface, a plurality of internal voids within the particles, a plurality of restrictive passageways within the particles, and an edible gas contained with the internal voids at a second high pressure. The restrictive passageways provide gaseous communication between the internal voids and the external surface and have a restrictive diameter. The restrictive diameter is effective for (1) allowing the edible gas to pass through the restrictive passageways from the external surface into the internal voids when the particles are contacted with the edible gas at a first high pressure to provide particles in which the internal voids contain the edible gas at the second high pressure and (2) allowing the gas within the internal voids at the second high pressure to escape slowly and controllably from the internal voids through the restrictive passageways when the particles are removed from contact with the gas at the first high pressure. The second high pressure is equal to or less than the first high pressure but is greater than ambient pressure. The particles having the internal voids containing the edible gas at the second high pressure, when contacted with an aqueous based medium, quickly dissolve, thereby releasing the edible gas from the internal voids into the aqueous based medium to provide a foam, froth, or aerated texture to the aqueous based medium.

According to another aspect of the present invention, a method is provided for manufacturing a gas-effusing particulate composition comprising particles having an external surface, a plurality of internal voids within the particles, a plurality of restrictive diameter passageways within the particles, and an edible gas contained with the internal voids at a second high pressure in gaseous communication between the internal voids and the external surface. The method comprises contacting a soluble, gas-injected, spray-dried particulate ingredient comprising particles having an external surface, a plurality of internal voids within the particles, and a plurality of restrictive diameter passageways within the particles with the edible gas at ambient temperature at a first high pressure such that the edible gas passes through the restrictive diameter passageways from the external surface into the internal voids to provide particles in which the internal voids contain the edible gas at the second high pressure, and then allowing the edible gas within the internal voids at the second high pressure to escape slowly and controllably from the internal voids through the restrictive passageways when the particles are removed from contact with the gas at the first high pressure. The second high pressure is equal to or less than the first high pressure but is greater than ambient pressure.

BRIEF DESCRIPTION OF THE DRAWINGS

FIG. 1 is a table showing beverage initial froth height charted against cappuccino mix storage time;

FIG. 2 is a table showing beverage incremental initial froth height charted against the natural logarithm of cappuccino mix storage time;

FIG. 3 is a table showing the effect of particulate ingredient gas-loading pressure and time on cappuccino beverage initial froth height;

FIGS. 4A-4F are scanning electron micrographs showing external and internal surfaces and pore structure of a particulate ingredient prior to loading with pressurized gas;

FIG. 5 is a table showing incremental pore volume, for the particulate ingredient shown in FIGS. 4A-4F, charted against mean pore diameter distribution obtained using mercury porosimetry intrusion analysis; and FIG. 6 is a table showing incremental pore surface area, for the particulate ingredient shown in FIGS. 4A-4F, charted against mean pore diameter distribution obtained using nitrogen gas adsorption analysis.

DETAILED DESCRIPTION

The present invention is directed to gas-effusing compositions and, in particular, to gas-effusing particulate compositions comprising particles having pressurized gas held within the pore structure thereof. In accordance with one aspect of the invention, a gas-effusing particulate composition is provided comprising particles having an external surface, a plurality of internal voids within the particles, a plurality of restrictive passageways within the particles, and an edible gas contained with the internal voids at a second high pressure. The restrictive passageways provide gaseous communication between the internal voids and the external surface and have a restrictive diameter. The restrictive diameter is effective for (1) allowing the edible gas to pass through the restrictive passageways from the external surface into the internal voids when the particles are contacted with the edible gas at a first high pressure to provide particles in which the internal voids contain the edible gas at the second high pressure and (2) allowing the gas within the internal voids at the second high pressure to escape slowly and controllably from the internal voids through the restrictive passageways when the particles are removed from contact with the gas at the first high pressure. The second high pressure is equal to or less than the first high pressure but is greater than ambient pressure. The particles having the internal voids containing the edible gas at the second high pressure, when contacted with an aqueous based medium, quickly dissolve, thereby releasing the edible gas from the internal voids into the aqueous based medium to provide a foam, froth, or aerated texture to the aqueous based medium.

As used herein, "pore structure" refers to a plurality of internal voids of the particles, and "internal voids" refers to open internal voids, also known as open pores, of the particles that are connected, directly or indirectly, to the surrounding atmosphere and may also be interconnected to one another by passageways or openings such as cracks, holes, pores, etc., and/or combinations thereof in the particles, wherein at least a portion of such openings have a sufficiently small diameter to substantially impede, through the process of molecular effusion, escape of pressurized gas therefrom. As used herein, the term "closed internal voids", also known as "sealed internal voids" or "closed pores", refers to those internal voids or pores of the particles that are unconnected to the surrounding atmosphere.

Preferably, at least a portion of the openings present in the particles are restrictive passageways. That is, they have a restrictive diameter that is substantially smaller (i.e., about 1/10th, preferably about 1/100th, and more preferably about 1/1000th the size) than the diameter of at least a portion of the internal voids. The restrictive passageways slow the transfer of gas molecules out of at least a portion of the internal voids, effective to substantially impede the escape of at least a portion of the pressurized gas from the particulate pore structure. In restrictive passageways having a non-uniform cross-section, the narrowest cross-sectional diameter is the limiting factor which governs gas molecule transfer rate. As used herein, use of the term "diameter" to describe the size of an opening, restrictive passageway, or orifice means cross-sectional diameter.

Preferably, at least a portion of the restrictive passageways have diameter that is less than about 1 micrometer ($\mu m$), more preferably less than about 0.1 $\mu m$, most preferably less than about 0.01 $\mu m$, and, optionally, less than about 0.001 $\mu m$. A diameter of 0.001 $\mu m$ is equivalent to 1 nanometer (nm) or 10 Angstroms (Å), which is only slightly larger than the effective molecular diameters, or so-called kinetic diameters or collision diameters, of many gases such as those present in the atmosphere. For example, the molecular diameters of hydrogen, helium, neon, argon, krypton, nitrogen, oxygen, carbon dioxide, and nitrous oxide are in the range of about 2-5 Å.

The open internal voids, of which at least a portion are directly or indirectly connected to the surrounding atmosphere through restrictive passageways, may have generally spherical shape with diameter preferably ranging between about 0.01-2000 $\mu m$, more preferably between about 0.1-1000 $\mu m$, and most preferably between about 1-100 $\mu m$, although internal voids having other shape and/or diameter are also contemplated. The individual particles may also have a generally spherical shape, with a diameter preferably between about 0.5-5000 $\mu m$, more preferably between about 1-1000 $\mu m$, and most preferably between about 5-500 $\mu m$, although particles having other shape and/or diameter are also contemplated. The process of filling the particles with pressurized gas, also referred to herein as loading, typically does not substantially alter particle shape or diameter, but may increase the number and/or diameter of openings and/or restrictive passageways in the particles. In some instances, such as when the pressurized particles are rapidly depressurized, some particles may fragment to some extent as a result of a sudden development of unbalanced forces exerted by the gas molecules on the internal surfaces of the pore structure.

The term "gas-effusing" as used herein, means that gas molecules present in the internal voids of a particulate effuse through openings in the internal voids in a slow and controllable manner generally conforming to established principals of gas effusion. As known to those skilled in the art, in accordance with the kinetic theory of gases, the rate of effusion of an ideal gas is related to gas pressure, temperature, and molecular weight, the volume of the container enclosing the gas, and the area of openings in the container. If the rate of effusion is expressed as the number of moles (N) of a gas that escapes, through an opening having area A, from a container per unit time (t), the rate can be expressed as change in N (dN) per change in t (dt). This rate can be obtained from $dN/dt = A(Pi-Po)/(2\pi MRT)^{0.5}$ where Pi is gas pressure inside the container, Po is gas pressure outside the container, $\pi$ is the mathematical constant pi (3.14), M is the gas molecular weight, R is the ideal gas constant, and T is temperature. The number of moles (N) of gas that can effuse from the container may be obtained from the ideal gas equation expressed as $N=V(Pi-Po)/RT$ where V is the container volume. These equations generally govern the rate and duration of effusion of gases from the particulate compositions of this invention. However, values for A and Pi are not easily measured for particulate compositions and, as a result, the rate and duration of gas effusion are obtained via experimentation. Because Pi continuously decreases with time, after an external gas pressure applied to a particulate composition is released, and approaches Po at a generally exponential rate, the rate of gas effusion from a particulate composition generally decreases exponentially over time until the gas pressure (Pi) in the container reaches equilibrium with the gas pressure (Po) in the surrounding atmosphere or vacuum.

It should be noted, however, that in the field of physical chemistry, gas effusion is an idealized type of gas diffusion that is generally manifested by a sequential flow of single gas molecules through a small orifice having negligible length, that occurs over a relatively small gas pressure drop between higher internal and lower external gas pressures, in the absence of collisions with other gas molecules or with orifice walls while within the orifice. Thus, the gas-effusing behavior of the compositions of the present invention cannot be expected to conform exactly to physical-chemical relationships derived from the kinetic theory of gases, because those relationships were developed based on the behavior of ideal gases under ideal conditions. The high pressures typically employed in the present invention can cause gases to deviate significantly from ideal behavior. Also, the compositions of the present invention typically have complex, non-uniform pore structures characterized by a wide range of internal void, opening, and restrictive passageway diameters. Further, restrictive passageways may occur as long or winding pores or as cracks with uneven surfaces that allow gas molecules to collide with others present therein and/or with surrounding walls.

In many instances, the pressurized particulate ingredients of the present invention may initially release gas molecules in a manner more generally conforming to the established principals of bulk flow (i.e., so-called mass flow, viscous flow, or turbulent flow) during a comparatively short period (i.e., seconds or minutes) immediately after depressurization, because pressurized gas held within internal voids connected to the atmosphere through any non-restrictive passageways can rapidly escape without being substantially impeded. This relatively short-lived initial release of gas will typically transition quickly to molecular effusion, which will then prevail for a much longer time period. Indeed, in such cases, the transition to molecular effusion typically occurs faster than the time required to measure the content of gas held within the particulate and the rate of gas loss therefrom.

The rate of gas effusion is primarily governed by the pore structure of the particles and will generally decrease with decreasing diameter, number, and/or volume of openings and restrictive passageways connecting the internal voids to the surrounding atmosphere. If the particles do not have the required pore structure, then molecular effusion will either not occur, or will occur only during a very short time period that would severely limit the composition's usefulness as a foaming agent. The rate and duration of gas effusion can be affected, to varying degrees, by other physical properties of the particulate ingredient, such as the diameter, number, and/or volume of internal voids, the ratio of internal void volume to restrictive passageway volume, and the total restrictive passageway opening area, as well as by processing conditions, such as the gas pressure and time used to fill the pore structure with pressurized gas.

It is known that occurrence of gas effusion in a model system, such as a container having a pinhole, is favored when the mean free path (the average distance traveled between collisions) of gas molecules present in the container is large compared to the diameter of the pinhole and small compared to the diameter of the container. These conditions reduce the frequency of collisions of gas molecules with the walls of the container and with the pinhole and serve to impede the rate at which gas escapes from the container. Although not wishing to be limited by theory, it is believed that gas effusion by the compositions of the present invention is similarly favored by the presence of at least some restrictive passageway diameters that are relatively small, and at least some internal void diameters that are relatively large, compared to the mean free path of gas molecules present within the pore structure of the particulate composition.

The mean free paths of different gas molecules under different conditions can be estimated using established relationships ascribed to the kinetic theory of gases. Mean free path generally increases with decreasing gas pressure and with increasing gas molecular weight. At the relatively high pressures typically used to load gas into the particulate compositions of the present invention, the substantially shortened mean free paths of the gas molecules can increase the rate at which the gas flows through at least some of the restrictive passageways into the internal voids to beneficially shorten the required gas-loading times. Conversely, the shortened mean free paths that prevail immediately after depressurizing the composition may produce a faster rate of gas loss from the particles than occurs after a time period sufficient to reduce the gas pressure and, thus, lengthen the mean free path. As a result, the rate of gas effusion steadily decreases, at an exponential rate, after depressurization.

It is known that gas molecules in model effusion systems collide with others and with the internal surface of the container until directly "colliding" with a pinhole to escape from the container. Again, although not wishing to be limited by theory, it is believed that this mechanism generally prevails in the gas-effusing compositions of the present invention, except that the gas molecules collide with other gas molecules and with the surfaces of the internal voids until they directly "collide" with an opening or a restrictive passageway to escape from the internal voids to the surrounding atmosphere. Further, because the internal voids present in the compositions of the present invention may be highly interconnected, it is believed that gas molecules may be exchanged between a potentially large number of internal voids, likely to some extent by the process of bulk flow in addition to molecular effusion, through openings and restrictive passageways, and that the resulting maze-like path that the gas molecules may take within the pore structure can advantageously slow the rate of effusion, as measured when gas molecules finally escape from external openings or restrictive passageways on the particle surface.

Thus, the restrictive passageways preferably have a diameter in the range of about 2 to about 5000 times, more preferably in the range of about 2 to about 500 times, and most preferably in the range of about 2 to about 50 times the diameter of the gas molecules held within the internal voids. With reference to the gas molecules held within the internal voids, the term "held" means that gas is present in the open internal voids of a particulate and is able to enter and leave the internal voids given adequate time. Preferably, after loading gas into the particulate composition according to embodiments of this invention, the majority of the gas present in the particulate is pressurized gas held in open internal voids thereof that are connected to the surrounding atmosphere. The remainder of any gas that may be present in the powder is primarily unpressurized gas entrapped in closed internal voids by manufacture of the particulate, such as by gas-injected spray-drying of aqueous solutions.

As used herein, the term "structure", "particulate structure", "particle structure", or "powder structure" means a structure which contains a large number of internal voids which are interconnected and/or open to the atmosphere. The term "pore structure" means a structure which contains internal voids, openings, and restrictive passageways, all of which are open to the atmosphere and to at least some extent may be interconnected with one another. Internal voids present within the pore structure are capable of holding a large volume of pressurized gas that is released as bubbles upon dissolution of the particulate in a liquid to produce foam, froth, aerated texture, or other benefit. The term "amorphous" means a glassy structure which is predominantly non-crystalline.

The term "powdered soluble foaming composition", "powdered foaming composition", "particulate foaming composition" or "foaming composition" means any particulate composition that is soluble in, or disintegrates in a liquid, and especially in an aqueous liquid, and that upon contact with such liquid forms a foam or froth, or provides an aerated texture.

The term "ambient temperature" means room temperature, which typically ranges between about 18-30° C., but may be higher or lower. Ambient temperature is often recorded in scientific experiments as being "at 25° C.", as practiced herein, even though the actual room temperature may have been slightly higher or lower. The term "atmospheric pressure" means ambient pressure, which varies slightly with weather and altitude, equal to 1 atmosphere pressure at sea level. The term "pressurized gas" means gas compressed to a pressure greater than ambient pressure, and is also known as superatmospheric pressure gas.

Gases that can suitably be used according to the present invention can be selected from nitrogen, carbon dioxide, nitrous oxide, air, argon, oxygen, helium, hydrogen, or mixture thereof. Nitrogen is preferred, but any other food-grade gas can be used to apply external gas pressure to the powder. Gases that are not approved for use in foods may be used to manufacture compositions of the present invention that are not intended for consumption. Also, in certain product applications, it might be desirable to pressurize particulate ingredients using an alternative gas, such as a hydrocarbon gas, an edible refrigerant gas, a halogenated hydrocarbon, or mixture thereof. Some of these gases may have much higher molecular weights than common atmospheric gases and may, therefore, provide significantly slower rates of effusion from the compositions, along with other benefits. Non-limiting examples of alternative gases would include propane, Freon 115, and Freon 318.

The gas-effusing compositions of the present invention are preferably formed of edible materials capable of retaining useful volumes of pressurized gas for predetermined time periods ranging from minutes to years, depending on the physical properties of the particulate ingredient, the pressure and composition of the gas held therein, storage temperature, and packaging methods. Processing and packaging methods, including optionally packaging under pressurized gas, can readily be controlled to provide gas-effusing compositions of the present invention or mixtures thereof, such as instant food and beverage mixes containing foaming compositions of the present invention, that have shelf-life particularly suited to various product applications. Processing can be done on a large scale, such as at a manufacturing facility, or on a smaller scale, such as at a retail or foodservice facility where the product is to be consumed, sold, or distributed.

The particulate ingredient may be of various forms including carbohydrate, protein, and/or mixtures thereof. In one preferred form, the particulate ingredient has an amorphous structure and comprises a low-density, gas-injected spray-dried skimmed milk powder (SMP). As used herein, the terms "skimmed milk powder" and "SMP" mean a particulate ingredient comprising dried skimmed (defatted) milk; these terms include skim milk powder, non-fat dry milk (NFDM) powder, or combinations thereof. SMP and NFDM powders typically have similar compositions, but may have slightly different protein contents since the former must have at least 34%, by weight, protein and the latter are unregulated and typically have 34-37%, by weight, protein. The terms SMP and NFDM are often used interchangeably and either name may often be used to describe the same powder. SMP and NFDM powders, such as those used in the present invention, typically contain about 1%, by weight, dispersed residual milk fat, but the exact level is not critical and may be higher or lower.

Other suitable gas-effusing compositions may be manufactured from low-density, gas-injected spray-dried milk powders having fat levels higher than those of SMP and NFDM powders. Such powders may, however, be more susceptible to oxidation and formation of off-flavors, which could lower flavor quality and reduce shelf-life. Further, suitable gas-effusing compositions may be manufactured from low-density, gas-injected spray-dried skimmed milk or milk powders that have been formulated, prior to drying, using milk protein concentrates and/or isolates produced from skimmed milk or milk, which have whey and casein levels, or total protein levels, that are comparable to, or greater than, those found in preferred SMP and NFDM compositions.

As used herein, the term "low-density" means a powder having a bulk density preferably below about 0.35 g/mL, more preferably below about 0.30 g/mL, most preferably below about 0.25 g/ml, and optionally, below about 0.20 g/mL. In the preferred form, the low-density, gas-injected spray-dried particulate ingredients are formulated to comprise, on a total weight basis including moisture, preferably at least about 60%, more preferably at least about 80%, still more preferably at least about 90%, and most preferably about 100%, SMP and/or NFDM. In the preferred form, any portion of a particulate that is not 100% SMP and/or NFDM may comprise optional carbohydrate spray-drying carriers (or bulking agents), supplemental protein sources, functional ingredients, surfactants, buffering agents, and/or combinations thereof.

Suitable optional carbohydrate spray-drying carriers that can be used to formulate the particulate compositions include, for example, but are not limited to sugars, polyhydric alcohols, sugar alcohols, oligosaccharides, polysaccharides, starch hydrolysis products, gums, soluble fibers, modified starches, modified celluloses, and mixtures thereof. Suitable sugars include glucose, fructose, sucrose, lactose, mannose, trehalose, and maltose. Suitable polyhydric alcohols include glycerol, propylene glycol, polyglycerols, and polyethylene glycols. Suitable sugar alcohols include sorbitol, mannitol, maltitol, lactitol, erythritol, and xylitol. Suitable starch hydrolysis products include maltodextrins, glucose syrups, corn syrups, high-maltose syrups, and high-fructose syrups. Suitable gums include xanthan, alginates, carrageenans, guar, gellan, locust bean, and hydrolyzed gums. Suitable soluble fibers include inulin, hydrolyzed guar gum, and polydextrose.

Suitable modified starches include physically or chemically modified starches that are soluble or dispersible in water. Suitable modified celluloses include methylcellulose, carboxymethyl cellulose, and hydroxypropylmethyl cellulose.

Suitable optional supplemental protein sources that can be used to formulate the particulate compositions include, for example, milk proteins, soy proteins, egg proteins, gelatin, collagen, wheat proteins, and hydrolyzed proteins. Suitable hydrolyzed proteins include hydrolyzed gelatin, hydrolyzed collagen, hydrolyzed casein, hydrolyzed whey protein, hydrolyzed milk protein, hydrolyzed soy protein, hydrolyzed egg protein, hydrolyzed wheat protein, and amino acids.

Optional functional ingredients that may enhance processing, nutritional value, flavor, or appearance can be used to formulate the particulate compositions, and may include, but are not limited to, organic and inorganic salts, surfactants, emulsifiers, phytochemicals, nutritional additives, flow agents, artificial sweeteners, preservatives, colorants, and some flavors. Lipids include, but are not limited to, fats, oils, hydrogenated oils, interesterified oils, phospholipids, waxes, sterols, stanols, terpenes, and fatty acids derived from vegetable, dairy, or animal sources.

The particulate compositions of the present invention can be produced by any method effective to provide a suitable particulate structure and pore structure having a plurality of internal voids, directly or indirectly connected to the atmosphere and surface of the particles through restrictive passageways, which are capable of holding a volume of pressurized gas for a period of time preferably greater than about 1 day, more preferably greater than about 1 week, still more preferably greater than about 1 month, and most preferably greater than about 1 year, when stored in a non-hermetically-sealed closed container under ambient pressure.

In one preferred form, conventional gas-injected spray drying of aqueous solutions is used to manufacture the particulate compositions. Spray drying of aqueous solutions without gas injection typically produces particulate compositions having relatively small internal void volumes. Gas-injected spray-drying can be conducted by dispersing gas or pressurized gas into an aqueous solution (preferably to provide a ratio of about 1-6, more preferably about 2-4, liters of gas per kilogram of dry solids dissolved in the aqueous solution and/or removed from the spray dryer) using any effective gas dispersing method, either before being transported to the spray dryer or during spray drying. Accordingly, gas may be injected into a batch of aqueous solution, but is preferably continuously injected in-line with mixing or homogenization prior to reaching the spray-dryer. Alternatively, two or more separate streams of gas and aqueous solution may be combined either at or in the spray-dryer nozzle or atomizer. Suitable gas compositions, gas-to-solution ratios, gas-injection methods, gas and solution flow rates, gas and solution pressures, solution temperatures, and spray dryer inlet and outlet temperatures can be readily determined by one of ordinary skill in the art of gas-injected spray drying. Nitrogen gas ($N_2$) is preferred, but any other food-grade gas can be used for gas injection, including air, carbon dioxide, nitrous oxide, or mixture thereof.

Particularly preferred SMP compositions used to form the gas-effusing compositions of the present invention are manufactured using conventional gas-injection spray drying. These particulate compositions do not contain any pressurized gas after spray drying and function only as conventional low-density foamer powders in their native form. Advantageously, no special techniques are needed to manufacture these preferred particulate compositions, which the present inventor has discovered unexpectedly possess a pore structure particularly suited to holding pressurized gas and enabling the manufacture of gas-effusing compositions of the present invention.

Optionally, the particulate compositions of the present invention may be formulated using one or more surfactants to improve bubble formation and creation of internal voids during spray drying. Use of suitable surfactants at appropriate levels can influence the relative size, number, and volume of internal voids. Suitable surfactants include food-approved emulsifying agents such as polysorbates, sucrose esters, stearoyl lactylates, mono/di-glycerides, diacetyl tartaric esters of mono/di-glycerides, and phospholipids. In addition, some carbohydrates are surface-active, including gum arabic, propylene glycol alginates, and lipophilic modified food starches such as octenylsuccinate substituted starches.

Optionally, the particulate compositions of the present invention may be formulated using one or more buffering agents to facilitate spray drying and reconstitution in liquid. Use of suitable buffering agents at appropriate levels can provide adequate particle internal void volumes while improving powder dissolution and product froth attributes. Preferred buffering agents used in this invention are salts of organic or inorganic acids. In addition to providing the benefits already mentioned, these buffering agents also improve resistance to protein aggregation or denaturation in certain product applications such as acidic beverages. The most preferred buffering agents are sodium and potassium salts of organic acids. Suitable buffering agents include, but are not limited to, sodium, potassium, calcium, and magnesium salts of citric, malic, fumaric, and phosphoric acid.

Powders used to manufacture the gas-effusing compositions of the present invention preferably have a bulk density and a tap density in the range of about 0.1-0.4 g/mL, more preferably about 0.2-0.3 g/mL, an apparent density preferably in the range of about 0.3-1.1 g/mL, more preferably about 0.4-1.0 g/mL, and most preferably about 0.5-0.9 g/mL, a material density of about 1.2-1.6 g/mL, an internal void volume in the range of about 0.5-5.0 mL/g, typically about 1.0-4.0 mL/g, and more typically about 2.0-3.0 mL/g, an apparent internal void volume (AIVV) in the range of about 0.2-3.0 mL/g, typically about 0.3-2.0 mL/g, and more typically about 0.4-1.0 mL/g, and % AIVV in the range of about 30-80%, typically about 35-70%, and more typically about 40-60%, before subjecting to external gas pressure.

Internal void volume and AIVV values are derived from two different methods used to measure the volume of the pore structure present in the particulate compositions. These two different methods, when used together, provide greater insight into the capacity of the particulate to both hold pressurized gas and release that pressurized gas by the process of molecular effusion. These methods are described below.

Powders with relatively large internal void volumes are generally preferred for use to manufacture the gas-effusing compositions of the present invention because of their greater capacity to hold gas. Powders having restrictive passageways in combination with relatively large internal void volumes and relatively large AIVV are particularly preferred because of their greater capacity to both hold gas and impede the rate of gas loss by effusion. Internal void volume is suitably at least about 0.5 mL/g, preferably at least about 1.0 mL/g, more preferably at least about 1.5 mL/g, and most preferably at least about 2.0 mL/g. AIVV is suitably at least about 0.2 mL/g, preferably at least about 0.4 mL/g, more preferably at least about 0.6 mL/g, and most preferably at least about 0.8 mL/g. The percent AIVV (% AIVV) is preferably at least about 30%, more preferably at least about 40%, and most preferably at least about 50%. The powders preferably have a glass transition temperature (Tg) between about 30-150° C., preferably about 35-125° C., and more preferably about 40-100° C. The powders preferably have a moisture content between about 0-15%, preferably about 1-10%, and more preferably about 2-5%, and water activity between about 0-0.5, preferably about 0.05-0.4, and more preferably about 0.1-0.3.

The gas-effusing particulate compositions of the present invention preferably hold gas in open internal voids present in the pore structure present therein, either at the time of use when reconstituted with a liquid, or immediately after depressurization, at an average absolute gas pressure of at least about 2 atm, more preferably at least about 3 atm, most preferably at least about 4 atm, and optionally, at least about 5 atm, or higher. Such higher average absolute gas pressures may include pressures of up to about 10 atm, 20 atm, or even higher, such as up to about 50 atm.

Percentages are based on the weight of the foaming composition, unless otherwise indicated. Bulk density (g/mL) is determined by measuring the volume (mL) that a given weight (g) of powder occupies when poured through a funnel into a graduated cylinder. Tap density (g/mL) is determined by pouring the powder into a graduated cylinder, vibrating the cylinder until the powder settles to its lowest volume, recording the volume, weighing the powder, and dividing weight by volume. Apparent density (g/mL) is determined by measuring the volume of a weighed amount of powder using a helium pycnometer (Micromeritics AccuPyc 1330) and dividing weight by volume.

Apparent density is a measure of density that includes the volume of any voids present in the particles that are unconnected to the atmosphere, such as closed internal voids. Apparent density also includes the volume of any voids present in the particles that are connected to the atmosphere, but which are inaccessible to penetration by the fairly low-pressure (less than about 20 psi gauge pressure) helium used by the pycnometer during the fairly short analysis time. Such voids, that are open and inaccessible to penetration during pycnometry analysis, include at least a portion of restrictive passageways and at least a portion of internal voids connected to the atmosphere, directly or indirectly, through restrictive passageways. Apparent density excludes the interstitial volume between particles and the volume of any voids present in the particles that are open to the atmosphere and accessible to helium penetration during pycnometry analysis.

The total volume of internal voids and openings that are unconnected to the atmosphere and/or inaccessible to helium gas penetration during pycnometry analysis, referred to herein as "occluded internal voids", may be derived from also measuring the apparent density of the powder after reconstituting the powder in water, freezing and freeze-drying the solution, and grinding the freeze-dried powder with mortar and pestle to remove, or open to the atmosphere, all closed or inaccessible voids originally present in the powder. This type of apparent density, referred to herein as "material density" (g/mL), is the actual density of only the solid matter comprising the powder.

Apparent internal void volume (AIVV), the volume of occluded internal voids contained in the particles, may be determined by subtracting the reciprocal material density (mL/g) from the reciprocal apparent density (mL/g). The percent AIVV, the volume percent of occluded internal voids contained in the particles, is determined by subtracting the reciprocal material density (mL/g) from the reciprocal apparent density (mL/g) and then multiplying the result by the apparent density (g/mL) and 100%.

Internal void volume (mL/g) may be determined by measuring the volume (mL) of liquid mercury that intrudes a weighed amount (g) of particulate under applied mercury pressure increasing from approximately 0 to 60,000 psi (gauge), using a mercury porosimeter (Micromeritics AutoPore III) and dividing the intruded mercury volume by the particulate weight. The method provides diameter, area, and volume distributions of the particulate pore structure and confirms the presence of internal voids, openings, and restrictive passageways connected, directly or indirectly, to the atmosphere. This method is commonly used to relate mercury intrusion pressures to powder pore diameters and volumes using standard mathematical relationships and assumptions built into the software utilized by the instrument. As applied pressure increases, the non-wetting mercury progressively intrudes smaller pores until the smallest diameter pore (3 nm or 30 Å) that can be intruded at 60,000 psi is filled. Corresponding pore diameter, area, and volume are calculated assuming a cylindrical pore cross-section. Each dose of mercury delivered at increasing pressure provides a new pore diameter and a corresponding incremental pore volume centered on the pore mean diameter between successive doses.

Smaller pores optionally may be measured using a mercury porosimeter that provides a higher upper pressure limit or by using a nitrogen gas adsorption analyzer (Micromeritics Gemini). The nitrogen adsorption method can be used to measure the pore diameter, area, and volume distributions of "micropores" (i.e., pores with diameters less than about 2 nm) and "mesopores" (i.e., pores with diameters between about 2-50 nm) present in the pore structure of the particulate ingredient and to confirm the presence of restrictive passageways having diameters within these ranges. This method is commonly used to measure the surface area of powders and to relate the amount of nitrogen gas physically adsorbed onto the surface of powders, at the boiling point (−196° C.) of liquid nitrogen, under applied gas "partial pressures" increasing from about 0 (vacuum) to about 1 atmosphere (absolute) pressure, using standard mathematical relationships and assumptions built into the software utilized by the instrument. As applied gas pressure increases, nitrogen progressively adsorbs onto the surface of larger pores, while filling micropores and mesopores upon adsorption of multiple layers of nitrogen molecules. Corresponding pore diameter, area, and volume are calculated assuming a cylindrical pore cross-section. Each dose of nitrogen gas delivered at increasing partial pressure provides a new pore diameter and a corresponding incremental pore area and volume centered on the pore mean diameter between successive doses. Pore mean diameter is the mathematical average of the lower and higher calculated pore diameters corresponding to the lower and higher nitrogen gas partial pressures delivered in successive doses. The lowest partial pressure utilized to analyze particulate compositions of the present invention was approximately 0.001 atmospheres, which theoretically corresponds to approximately 4.5 Å pore diameter. This is only slightly larger than the widely-accepted smaller molecular dimension (3.5 Å) of nitrogen gas. Although there is controversy among practitioners of gas adsorption analysis whether this technique can be used to precisely quantify pore diameters smaller than about 17 Å using established mathematical relationships and assumptions, information provided by this method has, nonetheless, been found to be useful for characterizing the compositions of the present invention.

The glass transition temperature marks a second-order phase change characterized by transformation of a powder composition from a rigid glassy particulate solid state to a softened rubbery particulate solid state. In general, gas solubilities and diffusion rates within the solid phase of particulate compositions are typically significant only in materials at or above the glass transition temperature. The glass transition temperature is dependent on chemical composition and moisture level and, in general, lower average molecular weight and/or higher moisture will lower glass transition temperature. The glass transition temperature can intentionally be raised or lowered by simply decreasing or increasing, respectively, the moisture content of the powder using any suitable method known to one skilled in the art. Glass transition temperature can be measured using established differential scanning calorimetry (DSC) or thermal mechanical analysis (TMA) techniques.

In accordance with another aspect of the invention, the gas-effusing compositions described herein are preferably manufactured according to a method comprising contacting a soluble, gas-injected, spray-dried particulate ingredient comprising particles having an external surface, a plurality of internal voids within the particles, and a plurality of restrictive diameter passageways within the particles with the edible gas at a first high pressure such that the edible gas passes through the restrictive diameter passageways from the external surface into the internal voids to provide particles in which the internal voids contain the edible gas at the second high pressure, and then allowing the edible gas within the internal voids at the second high pressure to escape slowly and controllably from the internal voids through the restrictive passageways when the particles are removed from contact with the gas at the first high pressure, wherein the second high pressure is equal to or less than the first high pressure but is greater than ambient pressure. This may be accomplished, for example, by sealing a gas-injected spray-dried powder having appropriate particle structure in a suitable vessel, pressurizing the vessel with compressed gas for a period of time effective to fill the internal voids of the particles with pressurized gas, and releasing the pressure in the vessel to recover the gas-effusing composition. The preferred method is to conduct gas pressurization and depressurization of the powder in the pressure vessel at ambient temperature without external heating or cooling. The temperature of the powder remains below the glass transition temperature during the pressurization and depressurization steps. In accordance with this method, gas-effusing compositions can be produced in batches or continuously using any suitable means.

In one preferred form, the particulate composition comprises a low-density, gas-injected spray-dried skimmed milk powder (SMP) having an amorphous structure. Preferably, the pressure inside the pressure vessel is in the range of 100-5000 psi, more preferably 500-3000 psi, and most preferably 1000-2000 psi. Use of nitrogen gas ($N_2$) is preferred, but any other food-grade gas can be used to pressurize the vessel, including air, carbon dioxide, nitrous oxide, argon, oxygen, helium, hydrogen, or mixture thereof.

The amount of time needed to fill the open internal voids in the particles comprising a powder with pressurized gas is dependent on the gas pressure and gas composition utilized and can readily be determined by those skilled in the art. Typically, the gas pressurization time is at least about 1 minute and preferably at least about 5 minutes, but may be up to many hours or days, especially when relatively low gas pressures are used. In some cases, it may take weeks for open internal voids in the particles to be completely filled with pressurized gas. Slow filling may be beneficially intentionally designed into a process, such as in product applications where the powder, or a mixture containing the powder, is packaged under an atmosphere of relatively low or moderately pressurized gas and then sent through product warehouses or distribution channels before reaching the consumer some time later. Powder held gas content and resulting foaming capacity generally increase with processing time and gas pressure.

Advantageously, the gas-effusing compositions of the present invention are able to deliver gas volumes comparable to conventional foaming compositions containing entrapped pressurized gas in closed pores or sealed internal voids at a significantly lower cost and faster processing rate because there is no need to heat and cool the particulate. Heating and cooling of particulate compositions under pressurized gas typically require use of more costly specialized equipment, prolong required processing times, and can cause unwanted powder agglomeration, flavor or color change, and equipment fouling. The gas-effusing compositions of the present invention are also capable of enhancing consumer-perceived milkiness and froth stability of products incorporating the compositions relative to the use of commercial non-protein foaming compositions containing entrapped pressurized gas.

The gas-effusing compositions of the present invention are able to deliver greater gas volumes than conventional gas-injected spray-dried atmospheric foamer powders. Such conventional gas-injected spray-dried atmospheric foamer powders typically have bulk density ranging between about 0.1-0.3 g/mL and gas content ranging between about 2-5 mL per gram of foamer powder. In contrast, the gas-effusing compositions of the present invention, which have bulk density similar to atmospheric foamer powders, have gas contents at the time of use when reconstituted with a liquid, preferably of at least about 8 mL, more preferably at least about 12 mL, and most preferably at least about 16 mL, per gram of gas-effusing composition. If desired, the gas contents of gas-effusing compositions, at the time of use when reconstituted with a liquid, optionally may be further increased, such as up to about 30 mL, possibly up to about 40 mL, or possibly even up to about 50 mL, or higher, per gram of gas-effusing composition.

Increased gas contents may be provided, for example, by utilizing higher gas pressures, longer gas pressurization times, higher molecular weight gases, storage at higher gas pressures or lower temperatures, or any combination thereof, according to the methods of the present invention. However, increases in gas contents to more than about 30 mL per gram of gas-effusing composition can provide larger foam cells than may be desired, when reconstituted with a liquid in some product applications, due to the greater relative expansion of released pressurized gas into liquids. Therefore, in some applications, it may be preferable to use a greater weight of a gas-effusing composition having lower gas content. Suitable gas content, weight, gas composition, and storage conditions for individual product applications can readily be determined by methods known to those skilled in the art.

Because of their much higher gas contents, the gas-effusing compositions of the present invention are able to deliver much greater foam volumes than conventional gas-injected spray-dried atmospheric foamer powders. For example, in hot beverages such as reconstituted instant cappuccino mixes, conventional gas-injected spray-dried atmospheric foamer powders typically provide foam volumes ranging between about 2-6 mL per gram of foamer powder. In contrast, in such hot beverage applications, and in general, the gas-effusing compositions of the present invention preferably provide foam volumes of at least about 12 mL, more preferably at least about 18 mL, and most preferably at least about 24 mL, per gram of gas-effusing composition. If desired, the foam volumes provided, at the time of use when reconstituted with a liquid, optionally may be further increased, up to as much as 70 mL, or higher, per gram of gas-effusing composition. Such increased foam volumes may be provided by utilizing gas-effusing compositions having higher gas contents.

The gas content may be determined by placing a known weight of atmospheric foamer powder or gas-effusing composition, alone or along with ingredients that either do not produce a significant amount of foam or produce a known amount of foam, into a 250 mL beaker having 65 mm (6.5 cm) internal diameter, adding 150 mL water at a temperature of 88° C., stirring to dissolve, and measuring the initial foam height against the beaker wall using a millimeter ruler. The volume fraction of gas present in the foam may be determined by placing a sample of foam into a graduated cylinder, dividing the measured weight (g) by measured volume (mL) to obtain foam density (g/mL), dividing the foam density by the measured density (g/mL) of the solution (obtained by weighing a known volume of solution after the foam dissipates), then subtracting the result from 1.0. In practice, the solution density is very close to that of water, and dividing the foam density by the solution density mainly serves to make the volume fraction of gas dimensionless. The gas volume fraction is typically about 0.8 for foam provided by instant hot cappuccino products, but may be slightly higher or lower. The foam volume (mL or $cm^3$) may be determined by multiplying the initial foam height (cm) by the beaker cylindrical cross-section area ($cm^2$). Foam volume is then multiplied by the gas volume fraction to obtain the volume of gas in the measured initial foam height. That gas volume, which corresponds to the measured solution temperature (generally about 75° C. for hot cappuccino), is then corrected downward, using the ideal gas equation, to correspond to the equivalent gas volume at 25° C. This entails multiplying the gas volume by the ratio of lower to higher temperature, in Kelvin units (K). For example, to correct from 75° C. to 25° C., the gas volume is multiplied by 298K/348K. The resulting gas volume (mL) is then divided by the powder weight (g) to obtain the gas content (mL/g) of the powder. If a mixture contains an ingredient that significantly increases the beverage foam height, its contribution is subtracted from that of the powder before the gas content is reported. If the composition contains any ingredient that has a significant destabilizing effect on foam, this formula would provide an erroneously low value.

The gas-effusing compositions of the present invention preferably provide at least an about three times, and more preferably at least an about four times, the gas content and delivered foam volumes of the original particulate ingredient either at the time of use when reconstituted with a liquid or immediately after depressurization. Optionally, pressurization may be conducted under conditions according to methods of the present invention, to provide even further increases in gas content and delivered foam volume, as much as about five times or higher. Prior to the present invention, such increases in gas content and delivered foam volume could only be attained using lengthy and costly methods requiring that the particulate be heated to a temperature above the glass transition temperature (Tg) of the amorphous particulate (and then cooled to below the Tg) while under an applied gas pressurize effective to entrap pressurized gas in sealed internal voids or closed pores present therein.

When any one of the beverage froth height, the incremental froth height, the composition gas content, or the delivered foam volume is plotted against the storage time of the gas-effusing composition beginning after depressurizing, the rate of decrease in these attributes will generally follow a straight-line equation having the form $y = A \log x + B$, where y is any one of the mentioned attributes, log x is the logarithm (log or ln) of storage time x, and A (slope) and B (y-axis intercept) are experimentally-determined constants that are specific to the particulate composition used to make the gas-effusing composition. One advantage of the identification and use of such an equation is that the rate of gas-effusion can be experimentally derived by measuring the rate of decrease of any one of the mentioned attributes over a relatively short period of storage time, such as hours or days, and the information obtained may be used to predict either a useful shelf life or the time at which the composition reaches equilibrium with the surrounding atmosphere, such as might occur weeks, months, or years later. For example, the mentioned straight-line equation can be experimentally derived, along with A and B values, to provide the rate of decrease in the beverage incremental froth height, corresponding to rate of effusion, over a period of several days. The equation can be mathematically solved, for example, by setting y equal to zero (no incremental froth height) to predict the time, x, at which the composition reaches equilibrium with the surrounding atmosphere, corresponding to duration of effusion. The equation can be solved for any other time, x, of interest to predict the beverage incremental froth height at that time, and corresponding rate of effusion. Predictions may be made using such an equation whether the surrounding atmosphere is ambient atmospheric pressure or a pressurized gas, such as might be applied to a composition that is stored in a pressurized package.

Thus, the method of the present invention can provide numerous processing advantages over conventional methods of increasing the gas contents and delivered foam volumes of amorphous particulate ingredients. Another advantage of the present invention is that gas-effusing foaming compositions may be conveniently refilled with pressurized gas, if desired, after some period of time or storage, to increase their gas contents and delivered foam volumes. A further advantage of the present invention is that use of different gases can provide gas-effusing compositions having different gas contents and different gas-effusion rates.

Advantageously, the gas-effusing compositions can be used immediately, alone or as ingredients to formulate food products, and can optionally be packaged under pressure to provide a shelf life suitable for commercial distribution. Suitable particulate ingredients used with this invention can be commercially sourced, easily and rapidly loaded with pressurized gas prior to distribution or loaded on-demand by a foodservice customer, at room temperature using available equipment or portable devices.

The preferred use for these gas-effusing foaming compositions is in soluble beverage mixes, particularly instant coffee and cappuccino mixes. However, they can be used in any instant food product that is rehydrated with liquid. Although these foaming compositions typically dissolve well in cold liquids to produce froth, dissolution and foaming capacity are generally improved by reconstitution in hot liquids. Applications may include, for example, instant beverages, desserts, cheese powders, cereals, soups, topping powders, sauces, and other products.

EXAMPLES

The examples herein further illustrate various features of the invention, but in no way limit the scope of the invention as set forth in the appended claims. Unless otherwise noted, all percentages and ratios are by weight.

The following working examples demonstrate the utility of gas-effusing compositions of the present invention in greatly increasing the froth volumes or overruns that can be obtained from food products such as instant hot cappuccino and cocoa mixes, instant cold dessert topping mixes, whitened brewed coffees, foaming soup mixes, cereal products, dessert mixes, sauce mixes, milkshakes, and the like.

Example 1

A gas-effusing composition was prepared from a commercially-sourced, low-density, gas-injected, spray-dried skimmed milk powder (SMP) (Lot 1) (Diehl Foods; Defiance, Ohio; Cocoa Riche LD brand NFDM powder) having an amorphous structure, a glass transition temperature (Tg) of 44° C., and a plurality of internal voids. A 6.0 g sample of the SMP was placed in a 75 mL stainless steel pressure vessel (Whitey gas sampling cylinder; rated to 1800 psi maximum pressure), which was then pressurized to 1000 psi with nitrogen gas at 25° C. The vessel was sealed by closing a valve connecting the vessel to the nitrogen gas source. The vessel was held for 5 minutes and then depressurized by venting to obtain the gas-effusing SMP composition.

Before pressurization, the SMP had a bulk density of 0.22 g/mL, a tap density of 0.31 g/mL, a material density of 1.44 g/mL, an apparent density of 0.63 g/mL, an internal void volume of 2.88 mL/g, and an apparent internal void volume (AIVV) of 0.89 mL/g (56% AIVV by volume). Thus, the internal void volume measured before pressurization was 1.99 mL/g larger (i.e., 3.2 times larger) than the AIVV. After pressurization, the SMP had an apparent density of 0.70 g/mL and an AIVV of 0.73 mL/g (51% AIVV by volume).

A cappuccino mix (Sample 1a) was prepared by adding 5.5 g of this gas-effusing SMP composition to 2.0 g soluble coffee powder, 4.0 g sugar, and 2.5 g 50% fat, non-foaming, high-density coffee whitener powder. A comparison cappuccino mix (Sample 1b) was prepared according to the formula above but replacing the gas-effusing SMP composition with an untreated SMP (Lot 1). Each mix was reconstituted five minutes after depressurization with 150 mL water at 88° C. in a 250 mL beaker having an internal diameter of 65 mm. The addition of the gas-effusing SMP composition was found to greatly increase the initial beverage froth height over the comparison cappuccino mix with the untreated SMP. More specifically, Sample 1a, the cappuccino mix containing the gas-effusing SMP composition, had a froth height of 39 mm, while Sample 1b, the cappuccino mix containing the untreated SMP, had a froth height of only 10 mm.

Accordingly, the gas content of the gas-effusing SMP composition, at the time of reconstitution, was about 16 mL/g while that of the untreated SMP was only about 4 mL/g. The delivered foam volume of the gas-effusing SMP composition, at the time of reconstitution, was about 23 mL/g while that of the untreated SMP was only about 6 mL/g. Thus, it can be seen that the method of the present invention provided about four times the gas content and delivered foam volume in this application.

Additional cappuccino mixes (Samples 1c-1q) were prepared according to the formula of Sample 1a and stored for varying time periods at room temperature in closed glass jars, which were sealed with gasketed metal screw cap lids (i.e., not hermetically sealed). When the mixes were reconstituted with hot water as described above, the initial beverage froth heights decreased as a function of the length of time the mix was stored. More specifically, as illustrated in FIG. 1, a generally logarithmic (0.99 correlation coefficient) reduction was observed in the initial beverage froth heights as a function of the mix storage time. Experimental data are summarized in Table 1 below.

The incremental initial beverage froth heights were calculated by subtracting the initial beverage froth height of the cappuccino mix formulated with the untreated SMP (Sample 1b) from the initial beverage froth heights of the stored cappuccino mixes formulated with the gas-effusing SMP composition. As can be seen in FIG. 2, plotting incremental initial froth heights as a function of the natural logarithm (Ln) of mix storage time provides a straight line (0.99 correlation coefficient) having slope (A) of −2.2323 and y-axis intercept (B) of 31.54. Extrapolating the line to zero incremental froth height (by setting y equal to zero and solving the straight-line equation) predicts that a storage time of about 950 days would be required for all of the pressurized gas held within the pore structure of the gas-effusing SMP composition to equilibrate (i.e., decrease to 1 atm pressure) with the surrounding atmosphere. Even with the acquired understanding of the gas-effusion mechanism controlling the behavior of compositions of the present invention, this constitutes an amazing result, considering that the SMP was contacted with pressurized gas for only five minutes during gas loading. If the underlying mechanism of operation had not been elucidated and mathematically modeled during the development of the present invention, such a result would be difficult to believe. The volume of gas that would effuse from the gas-effusing SMP composition over the storage period between 0.0021 days (first data point) and 950 days can be obtained by subtracting the gas content of the untreated SMP (about 4 mL/g) from the gas content of the treated SMP (about 16 mL/g) at 0.0021 days. The rate of effusion for the treated SMP would therefore be about 12 mL/g per 950 days, or about 0.013 mL gas/g/day. If the rate of effusion is calculated for any time before the 950-day storage time, a higher value is obtained, since the initial rate of effusion is very high and decreases generally exponentially over time.

TABLE 1

Cappuccino Mix Storage Time and Beverage Initial Froth Heights

| Sample | Storage Time (Days) | Initial Froth Height (mm) | Incremental Initial Froth Height (mm) | Ln Storage Time (Ln min) |
|---|---|---|---|---|
| 1c | 0.0021 | 39 | 29 | 1.099 |
| 1d | 0.0035 | 37 | 27 | 1.609 |
| 1e | 0.0059 | 36 | 26 | 2.140 |
| 1f | 0.0208 | 34 | 24 | 3.401 |
| 1g | 0.0521 | 33 | 23 | 4.317 |
| 1h | 0.2083 | 30 | 20 | 5.704 |
| 1i | 0.833 | 27 | 17 | 7.090 |
| 1j | 3.833 | 23 | 13 | 8.616 |
| 1k | 8.125 | 20 | 10 | 9.367 |
| 1l | 21.08 | 17.5 | 7.5 | 10.321 |
| 1m | 33.94 | 16 | 6 | 10.797 |
| 1n | 83.04 | 15 | 5 | 11.692 |
| 1o | 259 | 13 | 3 | 12.829 |
| 1p | 479 | 12 | 2 | 13.444 |
| 1q | 731 | 11 | 1 | 13.867 |
| Equilibrium End-Point Predicted by FIG. 2 Trend Line | | | | |
| | 950 | 10 | 0 | 14.129 |

Example 2

Additional lots (Lots 2 and 3) of the commercially-sourced SMP of Example 1 were pressurized using the method of Example 1. Before pressurizing, the SMP of Lot 2 had a bulk density of 0.23 g/mL, a tap density of 0.32 g/mL, a material density of 1.44 g/mL, an apparent density of 0.87 g/mL, an internal void volume of 2.82 mL/g, and an AIVV of 0.45 mL/g (40% by volume). Thus, the internal void volume measured before pressurization was 1.95 mL/g larger (i.e., 3.2 times larger) than the AIVV. After pressurization, the SMP of Lot 2 had an apparent density of 1.06 g/mL and an AIVV of 0.25 mL/g (26% by volume). Before pressurization, the SMP of Lot 3 had a bulk density of 0.24 g/mL, a tap density of 0.33 g/mL, a material density of 1.44 g/mL, an apparent density of 0.72 g/mL, an internal void volume of 2.64 mL/g, and an AIVV of 0.69 mL/g (50% by volume). Thus, the internal void volume measured before pressurization was 2.57 mL/g larger (i.e., 3.8 times larger) than the AIVV. After pressurization, the SMP of Lot 3 had an apparent density of 0.80 g/mL and an AIVV of 0.56 mL/g (44% by volume).

The gas-effusing compositions prepared from the SMP of Lots 2 and 3 were incorporated in cappuccino mixes (Samples 2a and 2b, respectively) according to the formula of Sample 1a to assess the effect of SMP production variability on pressure treatment and resulting foaming performance. Upon reconstitution with hot water as described in Example 1, Samples 2a and 2b provided initial beverage froth heights of 24 mm and 36 mm, respectively. Comparison cappuccino mixes (Samples 2c and 2d) were prepared, in which the gas-effusing compositions were replaced with the same weight of untreated SMP of Lots 2 and 3. Both comparison samples provided initial beverage froth height of only 10 mm.

Accordingly, the gas content of the gas-effusing SMP compositions, at the time of reconstitution, in Samples 2a and 2b, were about 10 mL/g and about 15 mL/g, respectively, while the gas content of both the untreated SMP compositions (Samples 2c and 2d) was only about 4 mL/g. The delivered foam volume of the gas-effusing SMP compositions, at the time of reconstitution, in Samples 2a and 2b, were about 14 mL/g and about 22 mL/g, respectively, while that of the untreated SMP compositions (Samples 2c and 2d) was only about 6 mL/g. Thus, the gas-effusing compositions of Samples 2a and 2b had gas contents and delivered foam volumes that were nearly three times and nearly four times, respectively, higher than the untreated SMP at the time of use when reconstituted with hot water in this product application. If desired, further increases could easily be achieved by the use of higher gas pressures during gas-loading, or other processing modifications according to the method of the present invention.

Next, a 6.0 g sample of a commercially-sourced, high-density spray-dried skimmed milk powder (SMP) (DairyAmerica; Fresno, Calif.; NFDM powder) was pressurized according to the method of Example 1, and 5.5 g of the pressurized high-density SMP was incorporated in a cappuccino mix (Sample 2e) prepared according to the formula of Sample 1a. Before pressurization, this high-density SMP had a bulk density of 0.46 g/mL, a tap density of 0.74 g/mL, an apparent density of 1.25 g/mL, and an AIVV of 0.11 mL/g (13% by volume). After pressurization, it had an apparent density of 1.27 g/mL and an AIVV of 0.09 mL/g (12% by volume). Upon reconstitution with hot water as described in Example 1, the pressurized powder provided an initial beverage froth height of only 5 mm without complete coverage of the beverage surface. Another comparison cappuccino mix was prepared, in which the above pressurized high-density SMP was replaced with the same weight of untreated high-density SMP. When reconstituted under the same conditions as above, this sample also provided an initial beverage froth height of 5 mm without complete coverage of the beverage surface. This result indicates that pressure treatment of high-density SMP does not produce a gas-effusing composition. The gas contents of the treated and untreated high-density SMP were only about 1 mL/g, and the delivered foam volumes were less than 2 mL/g. These results can be directly linked to inadequate high-density SMP particulate ingredient structure and pore structure. Such inadequacies include bulk density and apparent density that are too high, and AIVV and % AIVV that are too low, making the high-density SMP particulate ingredient structure and pore structure unsuitable for holding pressurized gas in open internal voids.

Example 3

The following example demonstrates the effects of gas pressure and pressurization time on the foaming capacity of gas-effusing compositions of this invention when incorporated in a cappuccino mix as described above. Additional 6.0 g samples of Lot 3 SMP of Example 2 were pressurized with nitrogen gas at 125 psi, 250 psi, 375 psi, 500 psi, 750 psi, 1000 psi, and 1250 psi using the method of Example 1 to obtain a series of gas-effusing compositions. 5.5 g samples of these gas-effusing compositions prepared at different pressures were separately used to formulate cappuccino mixes (Samples 3a-3g) according to the formula of Sample 1a and reconstituted 5 minutes after SMP depressurization according to the method of Example 1.

Initial beverage froth heights were measured and the results are shown in Table 2 below and in FIG. 3. As can be seen in FIG. 3, the initial froth heights, plotted as a function of the pressure used to prepare the gas-effusing compositions, initially increased disproportionately with increasing pressure between 0-500 psi and then increased linearly between 500-1250 psi. This behavior indicated that 5 minutes of pressurization was insufficient to reach equilibrium in the lower pressure range. Several additional experiments were conducted to test this hypothesis. Pressurization of another sample of Lot 3 SMP at 500 psi for 30 minutes did not result in an increase in initial froth height, suggesting comparable equilibrium was reached at 5 minutes. However, pressurization of another sample of Lot 3 SMP at 250 psi for 30 minutes increased the initial froth height somewhat, suggesting that comparable equilibrium was not reached at 5 minutes. Another sample of Lot 3 SMP pressurized at 250 psi for 20 hours (a time period expected to surpass comparable equilibrium) greatly increased initial froth height and the new point fell directly on a straight trend line formed by extrapolating the 500-1250 psi linear portion of the graph to lower and higher pressures. This result indicated that the 5 minute pressurization time could likely be significantly and progressively shortened at pressures greater than about 500 psi.

While the untreated Lot 3 SMP starting material provided only about 4 mL gas per gram in the cappuccino beverage, the gas-effusing SMP compositions, over the range tested, provided up to about 16 mL gas per gram. Also apparent was that the vast majority of gas held in the SMP samples that reached apparent equilibrium at relatively high gas-loading pressures was lost in the time period between depressurization and cappuccino mix reconstitution. Although not wishing to be limited by theory, over the range tested, it is believed that the average gas pressures inside the open internal voids of the SMP samples likely ranged from only about 1 to 6 atmospheres (atm) at the time of reconstitution, despite treatment with gas pressures of up to about 85 atm (1250 psi).

Hence, although relatively high gas pressures are needed to very rapidly load the SMP with compressed gas, retention of only a small remnant of that gas can greatly increase the gas content and foaming capacity of products incorporating the gas-effusing compositions of the present invention. Also, because the small remnant of gas effuses at a relatively slow rate, the gas-effusing compositions can be handled without much urgency. This provides an opportunity to quickly load a powder using relatively high gas pressure to obtain a gas-effusing composition, incorporate the gas-effusing composition into a food product, and then package the food product under significantly lower pressure to retain a remnant of gas in the gas-effusing composition effective to greatly increase the foaming capacity of the reconstituted food product. Alternatively, a food product formulated with a gas-effusing composition can be loaded with pressurized gas to increase foaming capacity by combining all ingredients, packaging under relatively low or moderate gas pressure, and allowing sufficient time for gas to enter the open internal voids of the composition prior to opening the package and reconstituting the food product.

It should be noted that, unless otherwise stated in the examples provided herein, the pressure vessel was closed immediately after pressurization. Accordingly, the pressures shown in FIGS. 1, 2, and 3 are initial pressures. Because some compositions, such as the SMP ingredients of Examples 1 and 2, have large open internal void volumes, initial pressure in the vessel may drop significantly as pressurized gas flows from the pressure vessel into the particle voids. Although not wishing to be limited by theory, this is believed to explain why the dashed trend line extrapolated to zero pressure (gauge pressure; equal to 1 atm absolute pressure and ambient pressure) in FIG. 3 does not intersect with the 10 mm froth height of the comparison cappuccino mix that replaced pressurized SMP with the same weight of unpressurized SMP.

It was hypothesized that supplemental addition of pressurized gas to the vessel during the holding period effective to maintain constant pressure could further increase beverage froth heights and produce a steeper extrapolated data trend line. To test this hypothesis, an additional 6.0 g sample of Lot 3 SMP was placed in a 75 mL vessel which was then pressurized to 1000 psi with nitrogen gas at 25° C., held under constant 1000 psi pressure for 5 minutes by keeping the vessel open to the nitrogen gas source, and depressurized by venting to obtain a gas-effusing composition. A 5.5 g sample of this gas-effusing SMP was incorporated into a cappuccino mix according to the formula of Example 1a (Sample 3h). When the mix was reconstituted 5 minutes after depressurization, an initial beverage froth height of 42 mm was obtained. This was significantly greater (by about 17%) than the 36 mm initial beverage froth height obtained when the vessel was sealed during the holding period, thus demonstrating an effective method to further increase the foaming capacity of gas-effusing compositions of this invention.

The gas contents of the gas-effusing SMP compositions providing the 42 mm and 36 mm initial froth heights, at the time of reconstitution with hot water, were about 17 mL/g and about 15 mL/g, respectively. The delivered foam volumes of the gas-effusing SMP compositions, at the time of reconstitution with hot water, were about 25 mL/g and about 22 mL/g, respectively, while that of the untreated SMP was only about 6 mL/g. Thus, it can be seen that the method of the present invention provided about four times the gas content and delivered foam volume in this application, and that these values may be further increased, if desired.

Although not wishing to be limited by theory, it is expected that use of gas pressures above 1250 psi to pressurize the SMP powder should provide even higher initial beverage froth heights and composition gas contents. For example, extrapolating the FIG. 3 trend line for the SMP of Lot 3 (slope equal to 0.016; y-axis intercept equal to 20) to 1500 psi, 2000 psi, 3000 psi, 4000 psi, or 5000 psi initial gas pressure would predict initial froth heights of about 44 mm, 52 mm, 68 mm, 84 mm, and 100 mm, respectively, and gas contents of about 18 mL/g, 21 mL/g, 28 mL/g, 35 mL/g, and 41 mL/g, respectively. Pressurizing the SMP powder samples of Lot 3 to 1500 psi, 2000 psi, 3000 psi, 4000 psi, or 5000 psi constant pressure, while keeping the vessel open to the nitrogen gas source, would be expected to provide higher values, such as potential initial froth heights of about 51 mm, 61 mm, 79 mm, 98 mm, or 117 mm, respectively, and potential gas contents of about 21 mL/g, 25 mL/g, 33 mL/g, 40 mL/g, or 48 mL/g, respectively.

Utilization of gas pressures much greater than about 1500 psi would require use of a thicker-walled pressure vessel having a higher pressure rating than the 75 mL vessel utilized in the experiments disclosed herein. However, such pressure vessels are readily available and do not have to be specially constructed to withstand the stresses of heating and cooling under applied high gas pressures. Further, utilization of gas-effusing compositions that provide initial froth heights much greater than about 40 mm would either require use of a beaker larger than 250 mL, or a reduced amount of water and/or composition weight, to prevent the beaker from overflowing and allow the measurement of froth height for determining composition gas content and delivered foam volume.

TABLE 2

Beverage Initial Froth Volume versus SMP Pressurization Conditions

| | Beverage Initial Froth Height (mm) | | |
|---|---|---|---|
| Gas Pressure (psi) | 5-Minute Pressurization Time | 30-Minute Pressurization Time | 20-Hour Pressurization Time |
| 0 | 10 | | |
| 125 | 11 | | |
| 250 | 15 | 17 | 24 |
| 375 | 21 | | |
| 500 | 28 | | |
| 750 | 32 | | |
| 1000 | 36 | | |
| 1250 | 40 | | |

Example 4

The following example demonstrates the utility of a gas-effusing composition of the present invention for increasing the overrun volume obtained from an instant cold dessert topping mix. An additional 8.5 g sample of Lot 3 SMP of Example 2 was placed in a 75 mL vessel, which was then pressurized to 1000 psi with nitrogen gas at 25° C., sealed, held for 5 minutes, and depressurized by venting to obtain a gas-effusing composition.

An instant dessert topping mix (Sample 4a) was prepared by adding 8.0 g of this gas-effusing composition to 5.0 g sugar in a 150 mL beaker having 53 mm internal diameter. A comparison dessert topping mix (Sample 4b) was prepared according to the same formula except that the gas-effusing composition was replaced by the same weight of untreated SMP. The instant dessert mix containing the gas-effusing composition (Sample 4a) provided a greatly increased volume and viscosity over the comparison dessert mix (Sample 4b) with the untreated SMP when each was reconstituted with 8 mL cold water (5° C.) and stirred to dissolve. The topping height in the beaker with the gas-effusing composition was about 60 mm at about 140% overrun while the topping height in the beaker of the comparison dessert mix was about 40 mm at about 60% overrun. Additionally, the 140% overrun dessert topping provided an indulgent whipped-cream-like spoonable texture with mouthfeel that was superior to the 60% overrun product, which had a somewhat runny texture not ideally suited for use as a dessert topping. Another comparison dessert topping (Sample 4c) was prepared as described above, except that the gas-effusing composition was replaced with the same weight of untreated high-density spray-dried SMP. When the mix was reconstituted with 8 mL cold water (5° C.) and stirred to dissolve, it produced a topping height of only 25 mm at essentially 0% overrun with somewhat watery texture not suitable for use as a dessert topping. Accordingly, only use of the gas-effusing SMP composition was effective in providing an instant dessert topping having acceptable volume, overrun, texture, and viscosity. Use of gas-effusing SMP compositions having even higher gas contents would be expected to provide instant dessert toppings having even higher volumes and overruns.

Example 5

The following examples demonstrate the effect of loading a gas-effusing composition of this invention for a relatively long time at a relatively low pressure and the ability to increase the froth volume obtained from a fat-free or fat-containing instant cappuccino mix. An additional 6.0 g sample of Lot 3 SMP of Example 2 was placed in a 75 mL vessel which was then pressurized to 300 psi with nitrogen gas at 25° C., immediately vented to 150 psi, sealed, held for 16 days, and then depressurized by venting to obtain a gas-effusing composition. During the holding period, the pressure in the vessel fell, from 150 psi, to about 90 psi. Although not wishing to be limited by theory, this was believed to be due primarily to relatively slow transfer of a significant portion of the gas into internal particle voids through restrictive passageways present in the SMP material. A 5.5 g sample of this gas-effusing SMP was mixed with 2.0 g soluble coffee powder and 4.0 g sugar in a 250 mL beaker (Sample 5a). Reconstitution with 150 mL water at a temperature of 88° C. provided an instant fat-free cappuccino beverage with a small-bubbled froth with an initial froth height of 30 mm. This indicates that the apparent equilibrium data points obtained in Example 2 (shown in FIG. 3) were not indicative of true final equilibrium, and that longer hold times can further increase the amount of pressurized gas that is transferred into the open internal particle voids. Gas filling and gas loss should both be log-rate phenomena and apparent equilibrium will be evident prior to final equilibrium.

Thus, this method of loading particulate ingredients at relatively low gas pressures for relatively long times could advantageously be used to produce a similar improvement in froth height by packaging the cappuccino mix in a small sealed container, such as a plastic bottle or metal can, sealing the container under about 10 atm (about 150 psi) gas pressure, and holding for a like (i.e., about 16 days), or perhaps even shorter, period of time before depressurizing and reconstituting. The SMP could optionally be pressurized to the same or higher pressure prior to blending with other ingredients in the cappuccino mix and/or packaging under pressure. Products could be packaged in either single or multiple serving portions. Once opened, multiple-serving packages would likely maintain excellent foaming performance for several days, and may provide satisfactory performance for over one or two weeks. Packaging under pressure could be accomplished by applying gas pressure or by dosing a small amount of liquefied gas, such as liquid nitrogen, for example, or solidified gas, such as dry ice, for example, into the package prior to sealing.

A comparison mix (Sample 5b) was prepared wherein the gas-effusing SMP was replaced with the same weight of untreated SMP starting material in the same fat-free cappuccino mix. Reconstitution as described above provided a beverage having an initial froth height of only 10 mm. Accordingly, the gas content and delivered foam volume of the untreated SMP starting material were only about 4 mL/g and only about 6 mL/g, respectively. Thus, it was observed that contacting the SMP starting material with pressurized gas under the conditions disclosed to provide a gas-effusing composition was effective to provide about three times the gas content (about 12 mL/g) and delivered foam volume (18 mL/g), relative to the untreated SMP starting material, at the time of reconstitution with hot water, despite the use of a relatively low gas pressure during SMP gas-loading to create the gas-effusing composition.

Foodservice bottles known in the art may be used as pressurizing systems to produce and store large amounts of gas-effusing powders of the present invention. Cornelius kegs (with 2.5 or 5 gallon volume), widely used by soda manufacturers for syrup distribution and dispensing prior to introduction of bag-in-box systems, are reportedly rated to withstand 100 psi pressure. A similar keg with somewhat higher pressure rating would be more effective for loading particulate ingredients to produce the gas-effusing compositions of this invention. The particulate ingredients could be pressurized with gas at a manufacturing facility and then distributed to customers in foodservice bottles, or bottles containing unpressurized particulate ingredients could be distributed to customers and then pressurized on-site as needed.

One application in which the gas-effusing compositions of the present invention may be particularly advantageous is to provide an effective powdered skimmed milk foamer for use in coffee shops and restaurants to replace steamed milk. A batch of powder could be quickly pressurized on-site in the morning and then used throughout the day. Unused powder could be re-pressurized (and thus re-filled with gas) one or more days later to restore foaming capacity. An inexpensive portable apparatus, including, for example, a hand pump, a compressor or gas cylinder to pressurize the powder inside a suitable vessel, would enable on-site processing. Additionally, some on-demand coffee brewers can deliver enough pressure to fill these materials with useful amounts of gas, but would need to be adapted to provide a supply of pressurized powder.

The present invention could also enable development of an entirely new category of packaged consumer products consisting of powders bottled or canned under moderate pressure. For example, a single serving of instant cappuccino mix or hot cocoa mix comprising a gas-effusing ingredient could be packaged in a small plastic or metal bottle and sealed under a headspace of pressurized gas. Pressurized gas would penetrate into the open internal voids during distribution and storage and subsequent reconstitution would provide a beverage with large froth volume. Two-liter plastic soda bottles reportedly can withstand pressures of up to about 10 atm or higher and smaller bottles should be able to withstand even higher pressures. Aluminum bottles having plastic screw-cap closures are also becoming more prevalent and could be made to withstand high pressures.

Packaging products such as instant cappuccino mixes which are formulated using gas-effusing compositions of this invention, in available containers within existing pressure limits, could be used to at least double, preferably at least about triple, more preferably at least about quadruple, and potentially even about quintuple foamer powder gas content and delivered foam volume relative to reference products formulated with untreated conventional atmospheric foamer powders, sufficient to meet prevailing enhanced froth quality targets preferred by consumers. Also, mixtures of gas-effusing compositions pressurized for different times and/or to different pressures and/or using different gases could also be manufactured to better control the overall rate of gas loss, retained gas content at the time of use, and useful shelf-life. For example, such actions could be taken to provide gas-effusing foamer compositions, or products formulated using them, having higher gas contents immediately after depressurization, slower rates of gas loss during storage and prior to use, and/or longer useful shelf-lives.

Example 6

An additional 6.0 g sample of Lot 3 SMP of Example 2 was placed in a 75 mL vessel, which was then pressurized to 150 psi with nitrogen gas at 25° C., held under constant pressure at 150 psi for 7 days by keeping the vessel open to the nitrogen gas source, and depressurized by venting to obtain a gas-effusing composition. A 5.5 g sample of this gas-effusing composition was added to a cappuccino mix (Sample 6a) consisting of 2.0 g soluble coffee powder, 4.0 g sugar, and 2.5 g non-foaming high-density coffee whitener powder (50% fat) in a 250 mL beaker having am internal diameter of 65 mm. A comparison cappuccino mix (Sample 6b) was prepared that replaced the gas-effusing SMP with the same weight of untreated Lot 3 SMP starting material. The mixes were separately reconstituted with 150 mL 88° C. water in a 250 mL beaker 3 minutes after SMP depressurization. The cappuccino mix with the gas-effusing composition (having about 12 mL/g gas content) produced an initial froth height of 28 mm. This was greatly increased over the comparison cappuccino mix with the untreated SMP (having only about 4 mL/g gas content), which produced an initial froth height of only 10 mm. Thus, contacting the SMP starting material with pressurized gas under these conditions was effective to provide about three times the gas content and delivered foam volume in this application.

Thus, this example demonstrates the ability, using available ingredients and gas pressurization equipment, to match or exceed enhanced instant cappuccino beverage froth heights, such as commercialized cappuccino mixes typically providing about 25 mm beverage froth height, that have been attained using a combination of non-protein pressurized-gas foamer powder (such as the composition described in Example 2 of U.S. Patent App. Pub. No. 2006/0040034 containing entrapped pressurized gas) and a conventional low-density gas-injected spray-dried protein-containing foaming creamer powder. The cappuccino mix containing the gas-effusing SMP had slightly lower recipe and powder volume than the mix containing the combination foamer system (formulated by replacing the 5.5 g gas-effusing composition with 3.0 g non-protein pressurized-gas foamer powder and 3.0 g foaming creamer powder) and would provide even somewhat larger froth volumes if scaled up to match the powder recipe or volume of the mix containing the combination foamer system.

The referenced non-protein pressurized-gas foamer powders are gas-injected spray-dried carbohydrate powders subsequently treated to entrap pressurized gas within sealed internal voids present therein made by sealing the powders in a pressure vessel, pressurizing to a high pressure, such as up to about 1000 psi, with nitrogen or other suitable gas, heating to above the powder glass transition temperature, holding for a prolonged period of time to allow the voids to be filled with pressurized gas, and then cooling to below the powder glass transition temperature prior to depressurizing the vessel, so as to entrap pressurized gas within sealed internal particle voids. Such non-protein pressurized-gas foamer powders typically have gas contents of about 20 mL/g, but may be higher or lower, and typically range between about 15-25 mL/g.

Example 7

The following example demonstrates the ability of gas-effusing compositions of the present invention to increase the froth volume obtained from an instant hot cocoa mix. A 6.0 g sample of Lot 3 SMP of Example 2 was placed in a 75 mL vessel which was then pressurized to 1000 psi with nitrogen gas at 25° C., sealed, held for 20 minutes, and depressurized by venting to obtain a gas-effusing composition. All 6.0 g of this gas-effusing composition was combined with 29 g Baker's™ Hot Cocoa mix in a 250 mL beaker (Sample 7a). The mix was reconstituted with 150 mL water at a temperature of 88° C., four minutes after SMP depressurization, and provided a hot cocoa beverage with 30 mm initial froth height. The froth had a creamy consistency and a predominantly fine-bubble-sized appearance. A comparison mix (Sample 7b) was prepared in which the gas-effusing SMP was replaced with the same weight of untreated SMP starting material. Reconstitution as above resulted in a beverage with an initial froth height of only 10 mm and a less-desirable, coarser froth appearance. Another comparison mix (Sample 7c) was prepared without addition of either the gas-effusing SMP or untreated SMP. Reconstitution of this mix provided a beverage with an initial froth height of only 7 mm and a less-desirable, coarser froth appearance. Thus, contacting the SMP starting material with pressurized gas under the conditions disclosed was effective in providing about three times the gas content and delivered foam volume in this application. Moreover, beverages formulated with the gas-effusing SMP and untreated SMP had improved flavor and mouthfeel compared to the beverage formulated without these ingredients.

Example 8

The following example demonstrates the ability of gas-effusing compositions of the present invention to produce a frothy topping on a brewed coffee beverage. A 9.0 g sample of Lot 3 SMP of Example 2 was placed in a 75 mL vessel, which was then pressurized to 500 psi with nitrogen gas at 25° C., held under constant 500 psi pressure for 10 minutes by keeping the vessel open to the nitrogen gas source, and depressurized by venting to obtain a gas-effusing composition. An 8.0 g sample of this gas-effusing composition was mixed with 4.0 g non-foaming high-density coffee whitener powder (50% fat) in a 400 mL beaker with an internal diameter of 72 mm (Sample 8a). Reconstitution with 150 mL freshly brewed Colombian coffee at a temperature of 65° C., three minutes after SMP depressurization, provided a whitened cappuccino beverage with an initial froth height of 24 mm. The froth had a creamy consistency and a predominantly light-colored fine-bubble-sized appearance. A comparison sample (Sample 8b), in which the gas-effusing SMP was replaced with the same weight of untreated SMP starting material, combined with the same weight of the coffee whitener powder and similarly reconstituted using the same volume of brewed coffee, produced a beverage having an initial froth height of only 8 mm with a similar light-colored, fine-bubble-sized froth appearance. Beverages formulated with either the gas-effusing SMP composition or untreated SMP starting material exhibited improved flavor and mouthfeel when compared to the brewed coffee alone and advantageously provided the equivalent of one-third serving of skimmed milk along with a good source of protein and calcium.

Thus, loading the SMP with pressurized nitrogen gas under the conditions indicated provided three times the effective gas content and foaming capacity, at time of reconstitution, in this product application. Larger froth volumes could be obtained, if desired, by increasing the gas pressure used to load the gas-effusing SMP composition with compressed nitrogen or other gas. Alternatively, a small amount of water, brewed coffee, milk, or other liquid may be used to reconstitute the gas-effusing SMP composition, or a mixture with coffee whitener powder, to create a separate frothy topping that may be poured into or spooned onto the brewed coffee beverage.

Example 9

Several alternative amorphous powders comprising particles containing internal voids were similarly assessed for their ability to provide effective gas-effusing compositions by separately placing 6.0 g samples of the powders in a 75 mL vessel, which was then pressurized to 1000 psi with nitrogen gas at 25° C., sealed, held for 5 minutes, and depressurized by venting. These included a high-density (0.40 g/mL bulk density), spray-dried SMP commercially-sourced from a different supplier (Sample 9a), a low-density (0.24 g/mL tap density), freeze-dried maltodextrin powder having very high-surface area (108 $m^2/g$) and microporous structure (Sample 9b), and a low-density (0.09 g/mL), spray-dried instant tea powder (Sample 9c). Other alternative amorphous powders containing internal voids that were similarly assessed included the low-density, gas-injected spray-dried non-protein powders of Examples 1, 2, 3, and 11 of U.S. Pat. App. Pub. No. 2006/0040034 (Sample 9d), the spray-dried non-carbohydrate powders of Examples 1 and 2 of U.S. Pat. App. Pub. No. 2006/0040033 (Sample 9e), and the coffee powders of Examples 1, 4, 6, 7, and 8 of U.S. Pat. App. Pub. No. 2006/0040038 (Sample 9f).

None of these alternative particulate ingredients were found to support the manufacture of gas-effusing compositions when contacted with pressurized nitrogen gas according to the method disclosed. They were each evaluated by mixing 5.5 g samples of the pressurized particulate ingredients with 4.0 g sugar and 2.5 g 50% fat, non-foaming, high-density coffee whitener powder, reconstituting the mixtures, soon after depressurizing, with 150 mL water at 88° C. in a 250 mL beaker having an internal diameter of 65 mm, and comparing initial froth heights to those of corresponding reference mixes that substituted equal weights of untreated particulate ingredients for the pressurized particulate ingredients. In all cases, no significant increases in initial froth heights were measured that exceeded about two times the initial froth heights provided by the corresponding reference mixes, and no evidence of gas effusion was observed. These pressurized particulate ingredients did not provide a measurable advantage beyond that provided by opening of vacuous internal particle voids.

However, a low-density (0.34 g/mL bulk density) gas-injected spray-dried amorphous powder (manufactured by a different supplier) (Friesland Foods; The Netherlands) consisting of skimmed milk solids (47%), glucose syrup solids and lactose (52%), and disodium phosphate buffer (1%), demonstrated potential for providing an effective gas-effusing composition upon being suitably reformulated to a significantly increased SMP content. Not wishing to be limited by theory, it is believed this amorphous SMP-containing particulate ingredient, having 0.34 g/mL bulk density, 1.49 g/mL material density, 0.71 g/mL apparent density, and 0.73 mL AIVV (52% AIVV), should be reformulated to comprise at least about 60%, preferably at least about 80%, and more preferably at least about 90%, by weight, SMP and/or NFDM to potentially provide an effective gas-effusing composition using the method of the present invention.

This SMP-containing powder was tested during development of the present invention by subjecting a 6.0 g sample to the pressurized gas-loading process and foam measurement method described in Example 1 herein. In this product application, the gas content of the untreated powder was observed to increase from about 4 mL/g to less than 8 mL/g after treatment, at the time of reconstitution. Another 6.0 g sample was similarly pressurized and evaluated after holding the treated powder for 4 days. The gas content of the stored treated powder appeared to perhaps only slightly decrease, to a value less than 7 mL/g. Compared to the preferred SMP or NFDM powders of the present invention, this pressurized SMP-containing particulate ingredient provided a significantly lower gas content and delivered foam volume, and did not provide a measurable advantage beyond that provided by opening of vacuous internal particle voids.

Example 10

The following example demonstrates the ability to enhance perceived milkiness and froth stability of an instant cappuccino beverage formulated with a gas-effusing composition of the present invention relative to use of a non-protein foaming composition containing entrapped pressurized gas. A 6.0 g sample of Lot 3 SMP of Example 2 was placed in a 75 mL vessel which was then pressurized to 1000 psi with nitrogen gas at 25° C., held under constant pressure at 1000 psi for 2.5 minutes, and depressurized by venting to obtain a gas-effusing composition. A cappuccino mix (Sample 10a) was prepared by adding 5.0 g of this gas-effusing composition to 2.0 g soluble coffee powder, 4.0 g sugar, and 4.0 g non-foaming high-density coffee whitener powder (50% fat). A comparison cappuccino mix (Sample 10b) was prepared according to the same formula except that the gas-effusing composition was replaced with an equal weight of a non-protein foaming composition comprising a nitrogen-injected spray-dried powder containing 92% maltodextrin and 8% sodium octenylsuccinate substituted modified starch (dry-basis) and subsequently loaded with entrapped pressurized gas using the method generally described in Example 2 of U.S. Patent App. Pub. No 2006/0040034 A1 (i.e., pressurizing a 6.0 g powder sample to 1000 psi with nitrogen gas at room temperature in a pressure vessel, heating the powder to above its glass transition temperature by heating the vessel at a temperature of 120° C. for more than 60 minutes, cooling the vessel to room temperature, and depressurizing the vessel by opening to release pressurized gas). Each mix was placed in a 250 mL beaker having an internal diameter of 65 mm and reconstituted with 150 mL water at a temperature of 88° C., five minutes after depressurization. Sample 10a, the cappuccino mix containing the gas-effusing composition produced an initial beverage froth height of 32 mm when reconstituted. Sample 10b, the comparison mix also produced an initial beverage froth height of 32 mm when reconstituted. The initial froth heights of both the comparison beverage and the beverage containing the gas-effusing composition of the present invention were measured in duplicate, and the froth heights were also measured over time for up to ten minutes after reconstitution to compare foam stability. As illustrated by the results shown in Table 3 below, the froth produced by the gas-effusing composition of the present invention was beneficially more stable than the froth produced by the comparison non-protein foaming composition and provided a significantly longer half-life (i.e., the time at which the froth has decayed to one-half (16 mm in this example) its initial height).

Replicated cappuccino beverages were evaluated by a trained sensory panel to determine perceived milkiness of each beverage. The panel was first calibrated by having the members observe the appearance and taste the flavor of a reference beverage comprising 2.0 g soluble coffee powder and 4.0 g sugar reconstituted with 50 mL lukewarm liquid whole milk and 100 mL water at a temperature of 88° C. in a 250 mL beaker. The use of whole milk imparted a fat level of approximately 15% higher (2.3 g) to the reference beverage than the fat level (2.0 g) imparted by the coffee whitener powder used to formulate both the beverage containing the gas-effusing composition of the present invention and the comparison beverage. The whole milk fat contained butterfat rather than hydrogenated coconut fat (as contained in the coffee whitener powder), and imparted the same approximate total level of non-fat milk solids (5.2 g) as was imparted by the combination of gas-effusing composition of the present invention (5.0 g) and the coffee whitener (0.2 g). The comparison beverage contained a much lower level of non-fat milk solids (0.2 g), which was imparted only by the sodium caseinate (protein) used to formulate the coffee whitener during manufacture to stabilize dispersed fat droplets.

The reference beverage was used to train the five-member sensory panel on how milk is perceived in a hot beverage containing soluble coffee and sugar. After calibration, the panel members evaluated and directly compared the beverage containing the gas-effusing composition of the present invention and the comparison beverage containing the non-protein foaming composition. The beverages were prepared in front of the panel, without knowledge of which beverage contained which foaming composition. Each member of the panel was separately asked to indicate which of the two beverages had milkier appearance, texture, flavor, aftertaste, and mouthfeel, and then each member of the panel was asked which beverage was milkier. After making these sensory evaluations, panel members were asked to indicate which beverage they would prefer to drink as a potential consumer, based only on personal preference rather than on sensory training or calibration, and the relative extent of their preference (mild, moderate, or strong). As illustrated by the results shown in Table 4, the panel members, both individually and collectively, rated the beverage containing the gas-effusing composition of the present invention as clearly being milkier than the comparison beverage containing the non-protein foamer. Two panel members expressed a mild preference for the comparison beverage because they perceived it to have stronger coffee impact than the beverage incorporating the composition of the present invention. The other three panel members expressed either a moderate (two members) or strong (one member) preference for the beverage containing the gas-effusing composition of the present invention because of its milkier attributes. Weighting these preference scores using a mathematical multiplier (mild=x1; moderate=x2; strong=x3) indicated a clear overall preference (3.5-to-1) for the beverage containing the gas-effusing composition of the present invention over the comparison beverage.

TABLE 3

Beverage Froth Evaluation and Additional Information

| Time (minutes) | Gas-Effusing Composition Froth Height (mm) | Comparison Composition Froth Height (mm) |
|---|---|---|
| initial | 32 | 32 |
| 0.5 | 28 | 28 |
| 1.0 | 24 | 24 |
| 2.0 | 20 | 20 |
| 3.0 | 19 | 18 |
| 4.0 | 18 | 17 |
| 5.0 | 18 | 16 |
| 6.0 | 17 | 15 |
| 7.0 | 17 | 15 |
| 8.0 | 16 | 14 |
| 9.0 | 16 | 14 |
| 10.0 | 16 | 13 |
| Beverage Froth Half-Life | 8-10 minutes | 5 minutes |
| Gas-Loading Time | Less than 3 minutes | Greater than 60 minutes |
| Gas-Loading Temperature | 25° C. | 120° C. |
| Heating and Cooling Needed | No | Yes |
| Composition Gas Content | 14 mL/g | 14 mL/g |
| Delivered Foam Volume | 21 mL/g | 21 mL/g |
| Location of Pressurized Gas | Pressurized Gas Held in Open Internal Voids | Pressurized Gas Entrapped in Sealed Internal Voids |

TABLE 4

Reconstituted Beverage Product Sensory Evaluation Results

| | Gas-Effusing Composition | Comparison Composition |
|---|---|---|
| | Number of Panel Responses | |
| 1. Which product has a milkier: | | |
| appearance & texture? | 4 | 1 |
| flavor & aftertaste? | 3 | 2 |
| mouthfeel? | 5 | 0 |
| 2. Which product is milkier? | 5 | 0 |
| 3. Which product do you personally prefer? | 3 | 2 |

| | Mild | Moderate | Strong |
|---|---|---|---|
| 4. What is the extent of your personal preference? (GE = Gas-Effusing; C = Comparison) | 2 (C/C) | 2 (GE/GE) | 1 (GE) |

| | Gas-Effusing Composition | Comparison Composition |
|---|---|---|
| Weighted Personal Preference (using multiplier) (mild = x1; moderate = x2; strong = x3) | 7 | 2 |
| | Gas-Effusing:Comparison = 3.5:1 | |

Example 11

The following example demonstrates the ability to characterize the physical and structural properties of the particulate ingredients and gas-effusing compositions of this invention. Separate samples of Lot 3 SMP of Example 2 were subjected to analysis by scanning electron microscopy (SEM), mercury porosimetry intrusion, and nitrogen gas adsorption prior to contacting with pressurized gas to obtain information related to the pore structure of the particulate ingredient.

FIGS. 4A-F are a compilation of SEM micrographs showing external and internal surfaces and pore structure. These images clearly confirm the particulate ingredient has porous structure comprised of internal voids that are directly or indirectly connected to the surrounding atmosphere through internal and external openings and restrictive passageways. It can also be seen that many internal voids are interconnected to others through multiple openings and restrictive passageways. Upon closer inspection, it can be seen that many translucent thin-walled surfaces exist which separate adjoining internal voids. Not wishing to be limited by theory, it is believed such surfaces are most likely penetrated by one or more invisibly-small restrictive passageways that slow the transfer of pressurized gas, by molecular effusion, between internal voids and into and out of the particles.

FIG. 5 is a mercury intrusion porosimetry graph that plots incremental pore volume as a function of the logarithm of pore mean diameter. Analytical data are provided in Table 5 below. The data clearly confirm the presence of both restrictive passageways and open internal voids. FIG. 5 clearly indicates three distinct ranges of mean pore diameter, the largest-diameter range being located between about 3-300 μm, the smallest-diameter range being located between about 3-20 nm, and an intermediate-diameter range being located between about 30-2000 nm. Not wishing to be limited by theory, it is believed that the largest-diameter range is nearly entirely comprised of internal voids but also includes some openings, the smallest-diameter range is effectively entirely comprised of restrictive passageways, and the intermediate-diameter range is mainly comprised of openings and restrictive passageways but also includes small internal voids. Similar analysis of samples of SMP Lot 1 of Example 1 and SMP Lot 2 of Example 2 produced generally the same trend as obtained for SMP Lot 3, namely the presence of three distinct pore mean diameter ranges, but with slightly to somewhat different range spans and associated incremental pore volumes.

FIG. 6 is a nitrogen adsorption graph that plots incremental pore surface area (which can be related to pore volume using established relationships associated with this analytical method) as a function of the logarithm of pore mean diameter. Analytical data are provided in Table 6 below. The data clearly confirm the presence of extremely small restrictive passageways. FIG. 6 clearly indicates the presence of a distinct fourth range of pore mean diameter, being located between about 0.5-2.8 nm (between about 5-28 Å), to supplement the three ranges identified using mercury porosimetry. SMP Lots 1 and 2 were not analyzed using this method, but would be expected to demonstrate generally the same trend. The same analysis indicated the SMP has monolayer surface area of about 0.4 m$^2$/g, much too low to provide any significant amount of physical gas adsorption at ambient temperature, or to significantly increase the ability of the powder to hold pressurized gas by physical adsorption.

TABLE 5

Mercury Porosimetry Analytical Data

| Liquid Mercury Intrusion Pressure (psi) | SMP Pore Mean Diameter (nm) | Log Pore Mean Diameter (Log nm) | Incremental Pore Volume (mL/g) |
|---|---|---|---|
| 0.59 | 306075.4 | 5.486 | 0.0000 |
| 1.97 | 198915.1 | 5.299 | 0.0409 |
| 2.98 | 76259.8 | 4.882 | 0.0261 |
| 3.96 | 53219.1 | 4.726 | 0.0545 |
| 5.46 | 39396.6 | 4.595 | 0.1932 |

TABLE 5-continued

Mercury Porosimetry Analytical Data

| Liquid Mercury Intrusion Pressure (psi) | SMP Pore Mean Diameter (nm) | Log Pore Mean Diameter (Log nm) | Incremental Pore Volume (mL/g) |
|---|---|---|---|
| 5.97 | 31702.2 | 4.501 | 0.2346 |
| 7.48 | 27238.7 | 4.435 | 0.2785 |
| 8.47 | 22779.2 | 4.358 | 0.1024 |
| 10.47 | 19321.1 | 4.286 | 0.2184 |
| 12.96 | 15615.8 | 4.194 | 0.0761 |
| 15.97 | 12640.0 | 4.102 | 0.0463 |
| 19.96 | 10193.2 | 4.008 | 0.0276 |
| 24.96 | 8154.0 | 3.911 | 0.0170 |
| 29.96 | 6642.2 | 3.822 | 0.0095 |
| 40.07 | 5275.9 | 3.722 | 0.0075 |
| 49.98 | 4066.5 | 3.609 | 0.0049 |
| 60.03 | 3315.8 | 3.521 | 0.0036 |
| 75.82 | 2699.1 | 3.431 | 0.0046 |
| 90.45 | 2192.4 | 3.341 | 0.0037 |
| 114.94 | 1786.5 | 3.252 | 0.0085 |
| 140.16 | 1432.0 | 3.156 | 0.0104 |
| 175.90 | 1159.3 | 3.064 | 0.0203 |
| 221.18 | 923.0 | 2.965 | 0.0420 |
| 275.00 | 737.7 | 2.868 | 0.0735 |
| 329.52 | 603.3 | 2.781 | 0.0980 |
| 423.08 | 488.2 | 2.689 | 0.1847 |
| 561.59 | 374.8 | 2.574 | 0.2077 |
| 660.74 | 297.9 | 2.474 | 0.1100 |
| 907.42 | 236.5 | 2.374 | 0.1728 |
| 999.45 | 190.1 | 2.279 | 0.0448 |
| 1244.56 | 163.1 | 2.212 | 0.0596 |
| 1539.59 | 131.4 | 2.119 | 0.0494 |
| 1943.89 | 105.3 | 2.022 | 0.0397 |
| 2353.82 | 84.9 | 1.929 | 0.0259 |
| 2899.40 | 69.6 | 1.843 | 0.0204 |
| 3632.61 | 56.1 | 1.749 | 0.0184 |
| 4585.53 | 44.6 | 1.649 | 0.0145 |
| 5591.34 | 35.9 | 1.555 | 0.0095 |
| 6890.66 | 29.3 | 1.467 | 0.0000 |
| 8605.49 | 23.6 | 1.373 | 0.0000 |
| 10611.85 | 19.0 | 1.279 | 0.0061 |
| 13282.17 | 15.3 | 1.185 | 0.0106 |
| 16360.26 | 12.3 | 1.090 | 0.0100 |
| 20047.90 | 10.1 | 1.004 | 0.0104 |
| 24965.22 | 8.1 | 0.908 | 0.0114 |
| 29942.27 | 6.6 | 0.820 | 0.0087 |
| 35131.33 | 5.6 | 0.748 | 0.0073 |
| 40071.98 | 4.8 | 0.681 | 0.0054 |
| 45072.71 | 4.3 | 0.633 | 0.0048 |
| 50054.00 | 3.8 | 0.58 | 0.0041 |
| 54978.04 | 3.5 | 0.544 | 0.0027 |
| 60005.98 | 3.2 | 0.505 | 0.0022 |

TABLE 6

Nitrogen Adsorption Analytical Data

| SMP Pore Diameter Range (Å) | SMP Pore Mean Diameter (Å) | Log Mean Pore Diameter (Log Å) | Incremental Pore Surface Area (m²/g) |
|---|---|---|---|
| 4.4-5.2 | 4.7 | 0.672 | 0.022 |
| 5.2-6.8 | 5.9 | 0.771 | 0.073 |
| 6.8-8.6 | 7.5 | 0.875 | 0.087 |
| 8.6-9.9 | 9.2 | 0.964 | 0.057 |
| 9.9-11.2 | 10.5 | 1.021 | 0.042 |
| 11.2-13.6 | 12.1 | 1.083 | 0.055 |
| 13.6-15.9 | 14.5 | 1.161 | 0.032 |
| 15.9-18.2 | 16.9 | 1.228 | 0.023 |
| 18.2-20.8 | 19.3 | 1.286 | 0.024 |
| 20.8-23.5 | 22.0 | 1.342 | 0.023 |
| 23.5-26.6 | 24.9 | 1.396 | 0.020 |
| 26.6-30.1 | 28.2 | 1.450 | 0.015 |
| 30.1-34.1 | 31.9 | 1.504 | 0.017 |
| 34.1-39.0 | 36.2 | 1.559 | 0.016 |
| 39.0-44.7 | 41.5 | 1.618 | 0.015 |
| 44.7-52.0 | 47.8 | 1.679 | 0.016 |
| 52.0-61.3 | 55.8 | 1.747 | 0.015 |
| 61.3-73.9 | 66.4 | 1.822 | 0.015 |
| 73.9-91.8 | 80.8 | 1.907 | 0.013 |
| 91.8-120.1 | 102.0 | 2.009 | 0.014 |
| 120.1-170.7 | 136.4 | 2.135 | 0.016 |
| 170.7-291.5 | 200.4 | 2.302 | 0.019 |
| 291.5-982.0 | 343.8 | 2.536 | 0.057 |

Although the invention has been described with respect to preferred embodiments, it will be apparent that the invention is capable of numerous modifications and variations, apparent to those skilled in the art, without departing from the spirit and scope of the invention.

What is claimed is:

1. A gas-effusing particulate foamer composition comprising low density, gas-injected, spray-dried particles having an external surface, a plurality of open internal voids within the particles, and gas held within the open internal voids at super-atmospheric pressure, the open internal voids in gaseous communication with the external surface of the particles and surrounding atmosphere via a plurality of restrictive passageways in the particles having a restrictive diameter, the restrictive passageways and restrictive diameter effective to permit release of the gas held in the open internal voids by molecular effusion into the surrounding atmosphere at an exponentially decreasing rate, the particles comprising at least about 60 percent by weight skim milk powder, non-fat milk powder, or combination thereof, the particles having a bulk density of less than about 0.35 g/mL.

2. A method for manufacturing a gas-effusing particulate composition, the method comprising:
    contacting a soluble, gas-injected, spray-dried particulate ingredient in a pressure vessel with an edible gas at super-atmospheric pressure at a temperature below the glass transition temperature of the particulate ingredient, the particulate ingredient comprising particles having an external surface, a plurality of open internal voids within the particles, and a plurality of restrictive passageways having a restrictive diameter within the particles such that the edible gas at super-atmospheric pressure passes through the restrictive passageways from the external surface into the open internal voids; and
    depressurizing the pressure vessel to provide the gas-effusing particulate composition having particles in which the super-atmospheric gas is held in the open internal voids, the open internal voids of the particles in gaseous communication with the external surface of the particles and surrounding atmosphere via the plurality of restrictive passageways in the particles, the restrictive passageways and restrictive diameter effective to permit release of the gas held in the open internal voids by molecular effusion into the surrounding atmosphere at an exponentially decreasing rate, the particles comprising at least about 60 percent by weight skim milk powder, non-fat milk powder, or combination thereof, and the particles having a bulk density of less than about 0.35 g/mL.

3. The composition of claim 1, wherein the restrictive diameter is less than about 1 µm.

4. The composition of claim 1, wherein the restrictive diameter is at least about 2 times the size of molecules of the edible gas.

5. The composition of claim 1, wherein the amount of super-atmospheric gas held within the open internal voids is at least about 8 mL per gram of composition.

6. The composition of claim 1, wherein the particles have a particle size in the range of about 0.5 to about 5000 μm.

7. The composition of claim 1, wherein the open internal voids have a diameter in the range of about 0.01 to about 2000 μm.

8. The method of claim 2 wherein the restrictive diameter is less than about 1 μm.

9. The method of claim 2, wherein the restrictive diameter is at least about 2 times the size of molecules of the edible gas.

10. The method of claim 2, wherein the amount of gas held within the open internal voids is at least about 8 mL per gram of composition.

11. The method of claim 2 wherein the particles have a particle size in the range of about 0.5 to about 5000 μm.

12. The method of claim 2, wherein the open internal voids have a volume in the range of about 0.5 to about 5.0 mL/g.

13. The method of claim 2, wherein the open internal voids have a diameter in the range of about 0.01 to about 2000 μm.

14. The gas-effusing particulate composition of claim 1 wherein the particles are soluble in an aqueous-based medium.

15. The gas-effusing particulate composition of claim 1 wherein the pressurized gas contained within the open internal voids is edible.

16. The gas-effusing particulate foamer composition of claim 1, wherein the particles comprise at least about 80 percent by weight skim milk powder, non-fat milk powder, or combination thereof.

17. The gas-effusing particulate foamer composition of claim 1, wherein the particles comprise at least about 90 percent by weight skim milk powder, non-fat milk powder, or combination thereof.

18. The gas-effusing particulate foamer composition of claim 1, wherein the particles have a bulk density of less than about 0.30 g/mL.

19. The gas-effusing particulate foamer composition of claim 1, wherein the particles have a bulk density of less than about 0.25 g/mL.

20. The gas-effusing particulate foamer composition of claim 1, wherein the particles have a bulk density of less than about 0.20 g/mL.

21. The gas-effusing particulate foamer composition of claim 1, wherein the particles have an internal void volume of at least about 0.5 mL/g.

22. The gas-effusing particulate foamer composition of claim 1, wherein the particles have an internal void volume of at least about 1.0 mL/g.

23. A gas-effusing particulate foamer composition comprising low density, gas-injected, spray-dried particles having an external surface, a plurality of open internal voids within the particles, and gas held within the open internal voids at super-atmospheric pressure, the open internal voids in gaseous communication with the external surface of the particles and surrounding atmosphere via a plurality of restrictive passageways in the particles having a restrictive diameter, the restrictive passageways and restrictive diameter effective to permit release of the gas held in the open internal voids by molecular effusion into the surrounding atmosphere at an exponentially decreasing rate, and wherein the particles do not entrap pressurized gas in sealed internal voids, the particles comprising at least about 60 percent by weight skim milk powder, non-fat milk powder, or combination thereof, and the particles having a bulk density of less than about 0.35 g/mL.

24. A gas-effusing particulate foamer composition comprising low density, gas-injected, spray-dried particles having an external surface, a plurality of open internal voids within the particles, and gas held within the open internal voids at super-atmospheric pressure, the open internal voids in gaseous communication with the external surface of the particles and surrounding atmosphere via a plurality of restrictive passageways in the particles having restrictive diameters, the restrictive passageways and restrictive diameters effective to permit release of the gas held in the open internal voids by molecular effusion into the surrounding atmosphere at an exponentially decreasing rate, and wherein the majority of gas present in the particles is the super-atmospheric pressurized gas held in the open internal voids, and any other gas present in the particles is unpressurized gas entrapped in closed internal voids formed during spray-drying, the particles comprising at least about 60 percent by weight skim milk powder, non-fat milk powder, or combination thereof, and the particles having a bulk density of less than about 0.35 g/mL.

25. The method of claim 2, wherein the particles comprise at least about 80 percent by weight skim milk powder, non-fat milk powder, or combination thereof.

26. The method of claim 2, wherein the particles comprise at least about 90 percent by weight skim milk powder, non-fat milk powder, or combination thereof.

27. The method of claim 2, wherein the particles have a bulk density of less than about 0.25 g/mL.

28. The method of claim 2, wherein the particles have a bulk density of less than about 0.20 g/mL.

* * * * *